(12) United States Patent
Mueller

(10) Patent No.: US 7,274,750 B1
(45) Date of Patent: Sep. 25, 2007

(54) GAIN AND PHASE IMBALANCE COMPENSATION FOR OFDM SYSTEMS

(75) Inventor: A. Joseph Mueller, San Diego, CA (US)

(73) Assignee: 3Com Corporation, Marlborough, MA (US)

( * ) Notice: Subject to any disclaimer, the term of this patent is extended or adjusted under 35 U.S.C. 154(b) by 1065 days.

(21) Appl. No.: 10/259,082

(22) Filed: Sep. 27, 2002

(51) Int. Cl.
H04K 1/02 (2006.01)
H04B 1/10 (2006.01)

(52) U.S. Cl. ...................................... 375/297; 455/296
(58) Field of Classification Search ................ 375/297, 375/298, 293, 316, 219; 455/296, 324
See application file for complete search history.

(56) References Cited

U.S. PATENT DOCUMENTS

| | | | |
|---|---|---|---|
| 5,764,706 A | 6/1998 | Carlin et al. | |
| 5,920,808 A | 7/1999 | Jones et al. | |
| 6,009,317 A * | 12/1999 | Wynn | 455/296 |
| 6,313,703 B1 | 11/2001 | Wright et al. | |
| 6,377,620 B1 * | 4/2002 | Ozluturk et al. | 375/235 |
| 6,392,480 B1 | 5/2002 | Ghanadan et al. | |
| 6,798,843 B1 | 9/2004 | Wright et al. | |
| 7,076,008 B2 * | 7/2006 | Jeong | 375/345 |
| 7,130,359 B2 * | 10/2006 | Rahman | 375/316 |
| 2003/0095607 A1* | 5/2003 | Huang et al. | 375/296 |
| 2003/0174783 A1* | 9/2003 | Rahman et al. | 375/298 |
| 2003/0206603 A1* | 11/2003 | Husted | 375/324 |
| 2004/0165678 A1* | 8/2004 | Nadiri | 375/296 |

OTHER PUBLICATIONS

Frank Zavosh, et al. "Digital Predistortion Linearizes CDMA LDMOS Amps" Microwaves & RF Mar. 2000, pp. 55-56, 58-59, 61 and 164.
Frank Zavosh, et al. "Digital Predistortion Techniques for RF Power Amplifiers with CDMA Applications" Microwave Journal, Oct. 1999, consisting of 8 pages.
Maria-Gabriella Di Benedetto and Paolo Mandarini "An Application of MMSE Predistortion to OFDM Systems" IEEE Transactions on Communications, vol. 44, No. 11 Nov. 1996, pp. 1417-1420.
James Lilly and Dr. Frank Zavosh "Variable Delay Lines Enhance Feedforward Power Amplifiers and Bypass Applications" Microwave Product Digest, Sep. 2001 consisting of 5 pages.
David Runton et al. "Gauge the Impact of Modulator Compensation on CDMA Performance" Wireless Systems Design Jul. 2000, consisting of 4 pages.
Mauri Honkanen and Sven-Gustav Haggman "New Aspects on Nonlinear Power Amplifier Modeling in Radio Communication System Simulations" IEEE May 1997, pp. 844-848.

(Continued)

Primary Examiner—Khai Tran
(74) Attorney, Agent, or Firm—McDonnell Boehnen Hulbert & Berghoff LLP

(57) ABSTRACT

The present invention includes methods and devices to compensate for gain and phase imbalance for OFDM and other multi-carrier symbol transmission systems. More particularly, methods and devices for determining compensation parameters are provided. This invention may be applied to a variety of standards utilizing OFDM technology, including IEEE 802.11a, Hiperlan/2 and MMAC. Further description of the invention and its embodiments are found in the figures, specification and claims that follow.

42 Claims, 3 Drawing Sheets

OTHER PUBLICATIONS

Adel A.M. Saleh "Frequency-Independent and Frequency Dependent Nonlinear Models of TWT Amplifiers" IEEE Transactions on Communications, vol. Com-29, No. 11, Nov. 1981, pp. 1715-1720.

Krzysztof Wesolowski, et al. "Efficient Algorithm for Adjustment of Adaptive Predistorter in OFDM Transmitter" IEEE 2000, pp. 2491-2496.

Davide Dardari "A Theoretical Characterization of Nonlinear Distortion Effects in OFDM Systems" IEEE Transactions on Communications, vol. 48, No. 10 Oct. 2000 pp. 1755-1763.

A.R. Kaye et al. "Analysis and Compensation of Bandpass Nonlinearities for Communications" IEEE Transactions on Communications, Oct. 1971, pp. 965-972.

A. Ghorbani and M. Sheikhan "The Effect of Solid State Power Amplifiers (SSPAs) Nonlinearities on MPSK and M-QAM Signal Transmission" Digital Processing of Signals in Communications, 1991, Sixth International Conference on Sep. 2-6, 1991, pp. 193-197.

Haobo Lai and Yeheskel Bar-Ness "A New Predistorter Design for Nonlinear Power Amplifiers Using the Minimum Distortion Power Polynomial Model (MDP-PM)" IEEE Aug. 2001 consisitng of 5 pages.

Chris van den Bos and Michiel H.L. Kouwenhoven "Effect of Smooth Nonlinear Distortion on OFDM Symbol Error Rate" IEEE Transactions on Communications, vol. 49, No. 9 Sep. 2001, pp. 1510-1514.

Takaaki Horiuchi et al. "Performance Evaluation of OFDM with the Compensation Technique of the Nonlinear Distortion Using Partial Transmit Sequence and Predistortion" IEEE Aug. 2001, consisting of 5 pages.

Weiyun Shan et al. "Spectral Sensitivity of Predistortion Linearizer Architectures to Filter Ripple" IEEE Aug. 2001, consisting of 5 pages.

Javad Yavand Hassani and Mahmood Kamareei "Quantization Error Improvement in a Digital Predistorter for RF Power Amplifier Linearization" IEEE Aug. 2001, consisting of 4 pages.

Hideo Yoshimi and Tomoaki Ohtsuki "An OFDM System with Modified Predistorter and MLS" IEEE Aug. 2001, consisting of 5 pages.

Sylvia Lin et al. "Quadrature Direct Conversion Receiver Integrated with Planar Quasi-Yagi Anetnna" IEEE MTT-S Intl. Microwave Symposium Digest, pp. 1285-1288, Jun. 2000, consisting of 4 pages.

J. Riches et al. "Statistical Error Shaping for Mismatch Cancellation in Complex Bandpass Delta-Sigma Modulators" Signal Processing Systems, 2000, SiPS 2000, 2000 IEEE Workshop on Oct. 11-13, 2000, pp. 771-780.

J.H. Mikkelsen et al. "Feasability Study of DC Offset Flitering for UTRA-FDD/WCDMA Direct-Conversion Receiver" Proceedings of 17th IEEE NORCHIP Conference, Olso, Norway, Nov. 1999, pp. 34-39.

Jan H. Mikkelsen "Evaluation of CMOS Front-End Receiver Architectures for GSM Handset Applications" Proc. of IEEE First International Symposium on Communications Systems & Digital Signal Processing (CSDSP), Sheffield, England pp. 164-167, Apr. 1998.

Joshua W. Shao et al. "Impact of Fading Correlation and Unequal Branch Gains on the Capacity of Diversity Systems" Proceedings of the IEEE Vehicular Technology Conference (VTC'99), pp. 2159-2169, May 1999.

Jack P.F. Glas "Digital I/Q Imbalance Compensation In A Low-If Receiver" Bell Labs, Lucent Technologies 1998 consisting of 6 pages.

* cited by examiner

GAIN AND PHASE IMBALANCE COMPENSATION FOR OFDM SYSTEMS

CROSS-REFERENCE TO RELATED APPLICATIONS

This application is related to the commonly owned, concurrently filed U.S. patent application Ser. No. 10/259,108, entitled "Cubic Spline Predistortion, Algorithm and Training, for a Wireless LAN System" by the same inventor. The related application is hereby incorporated by reference.

BACKGROUND OF THE INVENTION

The present invention includes methods and devices to compensate for gain and phase imbalance for OFDM and other multi-carrier symbol transmission systems. More particularly, methods and devices for determining compensation parameters are provided. This invention may be applied to a variety of standards utilizing OFDM technology, including IEEE 802.11a, Hiperlan/2 and MMAC.

Orthogonal frequency division multiplexing (OFDM) is a spectrally efficient modulation scheme with application in both wired and wireless communications. It is applied in existing wireless systems including IEEE 802.11a and 802.11g and is proposed for several next-generation wireless systems including IEEE 802.16 and 4th generation cellular. Because OFDM has high spectral efficiency, it is more susceptible to radio impairments. One such impairment, and the topic of this study, is gain and phase imbalance (also known as IQ offset).

Gain and phase imbalance are introduced at both the transmit and receive radios due to the typical variations in mixer components. The D/A and A/D converters may also introduce some gain imbalance; however, this imbalance can be treated as combined with that of the mixer. Gain imbalance occurs whenever the gains in the in-phase and quadrature paths are not identical and phase imbalance occurs whenever the phase separation of the in-phase and quadrature paths is not exactly 90 degrees. Typical gain and phase imbalances of analog mixers are on the order of 1 dB and 5 degrees, respectively. The effect of imbalance is a loss of orthogonality between the in-phase and quadrature paths. This loss of orthogonality can seriously degrade the link performance of an OFDM system, particularly when larger constellations are transmitted.

A major challenge in OFDM transceiver design is ensuring gain and phase balance at the transmitter and the receiver. Standards for OFDM transmission typically lack specific requirements for gain and phase balance, relying instead on performance standards that necessitate good balance. Typically, designers focus on improving the mixer section of the system, to avoid imbalance. This comes at the cost of a relatively expensive mixer section.

Accordingly, an opportunity arises to develop gain and imbalance compensation method and apparatus that improves system performance.

SUMMARY OF THE INVENTION

The present invention includes methods and devices to compensate for gain and phase imbalance for OFDM and other multi-carrier symbol transmission systems. More particularly, methods and devices for determining compensation parameters are provided. This invention may be applied to a variety of standards utilizing OFDM technology, including IEEE 802.11a, Hiperlan/2 and MMAC. Further description of the invention and its embodiments are found in the figures, specification and claims that follow.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

This describes an OFDM symbol transmission and receiver model, particularly an 802.11a system model, and analyzes the effects of gain and phase imbalance. A method is proposed for measuring the imbalance at a receiver assuming OFDM modulation. Once the imbalance is measured, it is compensated for. Optionally, compensation can be performed at both the transmitter and receiver. Transmitter based compensation pre-compensates for imbalance introduced at the transmit mixer. Two receiver based compensation algorithms are defined: one corrects for imbalance introduced at the receiver and the other compensates for imbalance introduced at the far-end transmitter. Although the primary goal is improving link performance, imbalance compensation will increase production yields by reducing the transceiver's sensitivity to mixer imbalance.

An alternate solution (besides specifying a high performance, and thus more expensive mixer) is to perform mixing in the digital domain. The disadvantage of digital mixing is the high sampling rate D/A's and A/D's that would be required (potentially equaling the costs of more expensive mixers). Furthermore, even if a digital mixer is used at the receiver, there is no guarantee that the far-end transmit mixer will be digital (or even a well balanced analog mixer).

GLOSSARY AND NOMENCLATURE

Many symbols are used in this application, so their meanings are set out here for reference.

Figure 1:
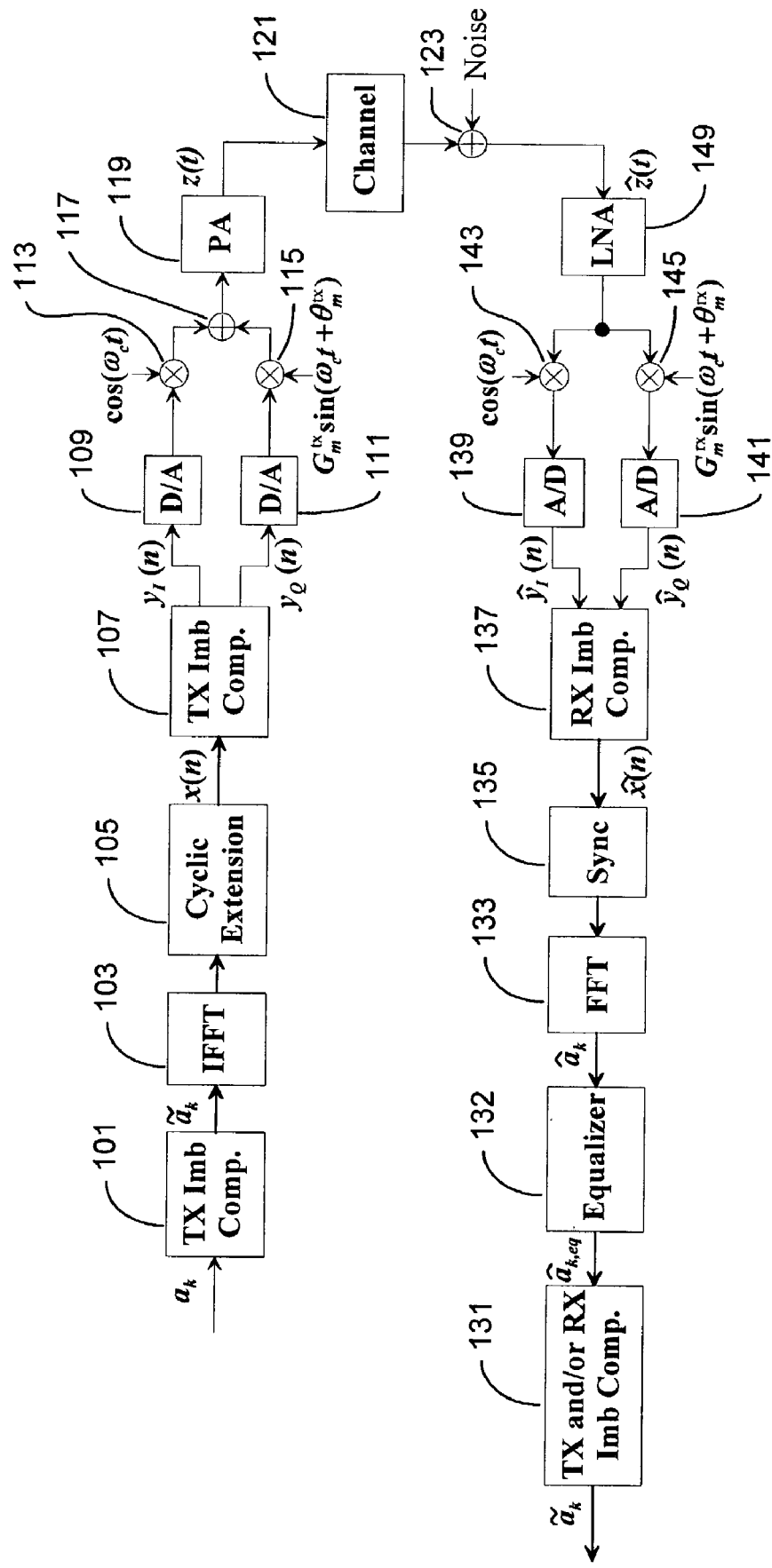
FIG. 1 illustrates a generic OFDM transceiver model used in this study.

A/D Analog to Digital Converter
D/A Digital to Analog Converter
dB Decibel
FFT Fast Fourier Transform
IEEE Institute of Electrical and Electronic Engineers
IFFT Inverse Fast Fourier Transform
IQ In-phase/Quadrature
ISI Inter-Symbol Interference LAN Local Area Network
LNA Low Noise Amplifier
OFDM Orthogonal Frequency Division Multiplexing
PA Power Amplifier
RX Receiver
TX Transmitter System Model FIG. 1 illustrates a generic OFDM transceiver model used in this study. It is not comprehensive, but rather highlights those system components required to analyze the effects of imbalance and the corresponding compensation schemes. Imbalance compensation is shown in both the transmit and receive chains for both frequency domain and time domain approaches. In practice, the transmitter typically will have either time or frequency domain TX imbalance compensation and the receiver will have frequency domain TX imbalance compensation and either time or frequency domain RX imbalance compensation. OFDM transceiver standards typically do not mention or mandate imbalance compensation. Typical performance requirements make it desirable to use either well-balanced mixers or imbalance compensation to ensure compliance.

The FIG. 1 model incorporates all the functionality of the 802.11a transmitter and receiver at the OFDM symbol level and below. It does not incorporate the 802.11a framing, scrambling, or convolutional encoding/interleaving, which were not necessary for this evaluation. The radio model consists of digital-to-analog converters (D/A's) 109, 111, a mixer 113, 115, 117 and a PA 117. A predistorter may be inserted between the OFDM transmitter and radio, as part of a time domain compensator 101 or a frequency domain compensator 107 to pre-compensate for non-linearities introduced by the PA. The predistorter is not mandated (or mentioned) in the 802.11a standard. IEEE Std 802.11a *Part 11: Wireless LAN Medium Access Control (MAC) and Physical Layer (PHY) Specifications: High-speed Physical Layer in the 5 GHz Band*, 1999. Reconstruction filters between the D/A's and the PA are assumed to have negligible effects and thus are ignored in the analysis. Those of skill in the art will recognize that additional steps may be implemented to address ripple and delay introduced by reconstruction filters. The time domain 101 and frequency domain 107 compensators also may be adapted to compensate for gain and phase imbalances.

OFDM symbols typically include 48 data carriers and 4 pilot carriers. The data carriers are modulated by a set of data symbols whose values for the purpose of this evaluation are independent, uniformly distributed random variables over the range of 0, 1, . . . , $2^{N_{bpsc}}-1$ where $N_{bpsc}$ represents the number of bits encoded onto each subcarrier. $N_{bpsc}$ may equal to 1, 2, 4 and 6 bits corresponding to gray-coded BSPK, QPSK, 16-QAM and 64-QAM constellations, respectively. The QAM Mapper maps each data symbol to its corresponding complex value. The pilot carriers are encoded as BPSK symbols with pseudo-randomly alternating phases in accordance with 802.11a.

The data and pilot carriers are combined into $d^{(1)}{}_n$, n=0, . . . , 63 complex points, and translated to the time domain by an N=64-point complex IFFT 103. Each block of N samples output from the IFFT forms a single OFDM symbol, which is then cyclic extended (105) with $N_{cp}=16$ samples and windowed 105. Although 802.11a specifies a raised cosine window of arbitrary length $w_T$ (where $w_T$ represents the number of samples overlap between adjacent OFDM symbols), its use is optional. For this analysis, windowing with $w_T=1$ was used to meet the PSD requirement of 802.11a. Oversampling of the transmit signal can be performed either in the time-domain using standard interpolation techniques or in the frequency domain by performing an osr×N-point IFFT on a zero padded input, where osr represents the oversampling rate. For this analysis, oversampling is performed in the frequency domain and $N_{cp}$ and $w_T$ are correspondingly scaled by osr.

The two D/A's convert the in-phase 107 and quadrature 109 components of the digital baseband signal 113, 115 to the analog domain for input to the mixer. The mixer 117 is modeled as a direct-to-RF mixer, for this analysis. A power amplifier 119 boosts the signal for transmission through a channel 121, which typically injects noise 123.

On the receiver side, the model components generally correspond to the transmitter components. A low noise amplifier (LNA) 149 is used to boost the received signal for processing. The in phase 143 and 145 quadrature components of the signal are reconstructed. A pair of A/D's convert the components from the analog domain to the digital domain. A receiver imbalance compensator 137 may be applied to correct for gain and phase imbalance, in the time domain. A sync component 135 processes the signal before a Fast Fourier Transform 133 is applied to convert the signal from the time to frequency domain. An equalizer 132 uses one or more reference carriers to equalize the received signal. Additional compensation may be applied in the frequency domain 131.

In this analysis, the following simplifying assumptions are made: The duration of the channel impulse response is shorter than the duration of the cyclic extension minus the duration of the windowing overlap. This allows the cyclic extension and any windowing operations to be omitted from this analysis. And, the carrier frequency offset between frequencies of the transmitter and receiver is assumed to be negligible. Those of skill in the art will recognize that the equations presented here may be generalized to include such offsets.

End-to-end frequency-domain models describing transmitter and receiver imbalance are derived here for both no channel and multipath channel cases. These frequency domain models relate the received complex constellation points to the transmitted points. From this, methods of measuring and compensating for imbalance are developed.

No Channel

This simplified model considers the impact of transmitter and receiver imbalance when there is no channel. This exercise is useful for characterizing the impact of imbalance (without other impairments), as well as for determining how to compensate for TX imbalance at the transmitter since TX compensation at the transmitter is independent of the channel.

Consider the set of N complex constellation points $a_k = a^R_k + ja^I_k$, $k=0, 1, \ldots, N-1$ which are transmitted as a single OFDM symbol. These are converted from the frequency domain to the time domain using an N-point IFFT as follows $$x(n) = \frac{1}{N}\sum_{k=0}^{N-1}(a_k^R + ja_k^I)[\cos(2\pi nk/N) + j\sin(2\pi nk/N)]$$

$$= \frac{1}{N}\sum_{k=0}^{N-1}[a_k^R\cos(2\pi nk/N) - a_k^I\sin(2\pi nk/N)] +$$

$$j\frac{1}{N}\sum_{k=0}^{N-1}[a_k^R\sin(2\pi nk/N) + a_k^I\cos(2\pi nk/N)]$$

for $n=0, 1, \ldots, N-1$. The IFFT output, $x(n)$, is passed through the transmitter's TX I/Q Imbalance Compensator to obtain $y(n)$. For the development of this model, the imbalance compensator is disabled such that $y(n)=x(n)$. The in-phase and quadrature components of $y(n)$ are each passed through a D/A converter and then mixed to some carrier frequency $f_c$ to obtain the real valued RF signal $$z(t) = y_I(t)\cos(2\pi f_c t) - y_Q(t)G^{tx}_m \sin(2\pi f_c t + \theta^{tx}_m)$$

where $G^{tx}_m$ and $\theta^{tx}_m$ represent the gain and phase imbalance of the transmit mixer, D/A's and amplifiers referenced to the in-phase component. Assuming no channel impairments, the receiver mixes the received RF signal back to complex baseband (filtering out the image frequencies and scaling by a factor of 2)

$$\hat{y}_I(t) = 2\{[y_I(t)\cos(2\pi f_c t) - y_Q(t)G^{tx}_m\sin(2\pi f_c t + \theta^{tx}_m)]\cos(2\pi f_c t)\}_{LPF}$$

$$= y_I(t) - y_Q(t)G^{tx}_m\sin(\theta^{tx}_m)$$

$$\hat{y}_Q(t) = 2\{-[y_I(t)\cos(2\pi f_c t) - y_Q(t)G^{tx}_m\sin(2\pi f_c t + \theta^{tx}_m)]G^{rx}_m\sin(2\pi f_c t + \theta^{rx}_m)\}_{LPF}$$

$$= G^{rx}_m[y_Q(t)G^{tx}_m\cos(\theta^{tx}_m - \theta^{rx}_m) - y_I(t)\sin(\theta^{rx}_m)]$$

where $G^{rx}_m$ and $\theta^{rx}_m$ represent the combined gain and phase imbalance of the receive mixer, A/D's and amplifiers, again referenced to the in-phase component. Converting to the digital domain and rewriting the received baseband signal in complex notation $$\hat{y}(n) = y_I(n)[1 - jG^{rx}_m\sin(\theta^{rx}_m)] + jy_Q(n)[G^{rx}_m G^{tx}_m\cos(\theta^{tx}_m - \theta^{rx}_m) + jG^{tx}_m\sin(\theta^{tx}_m)].$$

Defined two time-invariant intermediary values $$\alpha = 1 - jG^{rx}_m\sin(\theta^{rx}_m)$$

$$\beta = G^{rx}_m G^{tx}_m\cos(\theta^{tx}_m - \theta^{rx}_m) + jG^{tx}_m\sin(\theta^{tx}_m)$$

such that $$\hat{y}(n) = \alpha y_I(n) + j\beta y_Q(n).$$

Ignoring the effects of the receiver's time-domain I/Q imbalance compensator, $\hat{x}(n) = \hat{y}(n)$. The reference to whether this compensates for transmitter or receiver imbalance is intentionally omitted because, for the case of no channel, both transmitter and receiver imbalance can be compensated for in the time domain. The received set of constellation points is decoded using the FFT as follows $$\hat{a}_k = \sum_{n=0}^{N-1}[\alpha y_I(n) + j\beta y_Q(n)][\cos(2\pi nk/N) - j\sin(2\pi nk/N)]$$

$$= \frac{1}{N}\sum_{n=0}^{N-1}\left[\begin{array}{l}\alpha\sum_{k'=0}^{N-1}[a_{k'}^R\cos(2\pi nk'/N) - a_{k'}^I\sin(2\pi nk'/N)] + \\ j\beta\sum_{k'=0}^{N-1}[a_{k'}^R\sin(2\pi nk'/N) + a_{k'}^I\cos(2\pi nk'/N)]\end{array}\right][\cos(2\pi nk/N) - j\sin(2\pi nk/N)]$$

$$= \frac{1}{N}\sum_{n=0}^{N-1}\sum_{k'=0}^{N-1}\left[\begin{array}{l}a_{k'}^R[\alpha\cos(2\pi nk'/N) + j\beta\sin(2\pi nk'/N)] + \\ ja_{k'}^I[\beta\cos(2\pi nk'/N) + j\alpha\sin(2\pi nk'/N)]\end{array}\right][\cos(2\pi nk/N) - j\sin(2\pi nk/N)]$$

for $k=0, 1, \ldots, N-1$. This can be simplified into the following form (where, for convenience, $$A = 2\pi nk'/N$$

and $$B = 2\pi nk/N)$$

$$\hat{a}_k = \frac{1}{2N}\sum_{n=0}^{N-1}\sum_{k'=0}^{N-1}\left[\begin{array}{l}(\alpha a_{k'}^R + j\beta a_{k'}^I - \beta a_{k'}^R - j\alpha a_{k'}^I)\cos(A+B) + \\ (\alpha a_{k'}^R + j\beta a_{k'}^I + \beta a_{k'}^R + j\alpha a_{k'}^I)\cos(A-B) + \\ (j\beta a_{k'}^R - \alpha a_{k'}^I - j\alpha a_{k'}^R + \beta a_{k'}^I)\sin(A+B) + \\ (j\beta a_{k'}^R - \alpha a_{k'}^I + j\alpha a_{k'}^R - \beta a_{k'}^I)\sin(A-B)\end{array}\right]$$

$$= \frac{1}{2N}\sum_{n=0}^{N-1}\sum_{k'=0}^{N-1}\left[\begin{array}{l}a_{k'}^*(\alpha-\beta)\cos(A+B) + a_{k'}(\alpha+\beta)\cos(A-B) - \\ ja_{k'}^*(\alpha-\beta)\sin(A+B) + ja_{k'}(\alpha+\beta)\sin(A-B)\end{array}\right]$$

for $k=0, 1, \ldots, N-1$ where * indicates complex conjugation. Reversing the order of summation and substituting back in the values for A and B $$\hat{a}_k = \frac{\alpha-\beta}{2N}\sum_{k'=0}^{N-1}a_{k'}^*\sum_{n=0}^{N-1}\{\cos[2\pi n(k'+k)/N] - j\sin[2\pi n(k'+k)/N]\} +$$

-continued $$\frac{\alpha+\beta}{2N}\sum_{k'=0}^{N-1}a_{k'}\sum_{n=0}^{N-1}\{\cos[2\pi n(k'-k)/N]+j\sin[2\pi n(k'-k)/N]\}$$

for k=0, 1, . . . , N−1. This can be simplified using the following sets of relations:

$$\sum_{n'=0}^{N-1}\cos(2\pi nm/N)=\begin{cases}N & m=iN, \quad i=\text{integer}\\ 0 & \text{otherwise}\end{cases}$$

and $$\sum_{n=0}^{N-1}\sin(2\pi nm/N)=0, m=\text{integer.}$$

Thus in the equation for $\hat{a}_k$ above, the sine terms disappear, the first cosine term is equal to N whenever k'=k=0 or k'+k=N and the second cosine term is equal to N whenever k'=k:

$$\hat{a}_k=\begin{cases}\alpha a_0 & k=0\\ \frac{\alpha+\beta}{2}a_k+\frac{\alpha-\beta}{2}a^*_{N-k} & k=1,2,\ldots,N-1\end{cases}$$

Thus, imbalance exhibits itself as deterministic interference from exactly one other sub-carrier. Here, this interference is labeled the IQ imbalance image (or just image) and the (N−k)-th subcarrier as the image carrier. When the imbalance is zero, $\alpha=\beta=1$ and $\hat{a}_k=a_k$, as expected. This signal represents the FFT output and still requires equalization to compensate for channel distortion. The following two sections consider two types of adaptive equalizers: the first trains over a single OFDM symbol, possible repeated while the latter trains over multiple different OFDM symbols such that the effects of imbalance are averaged.

Figure 2:
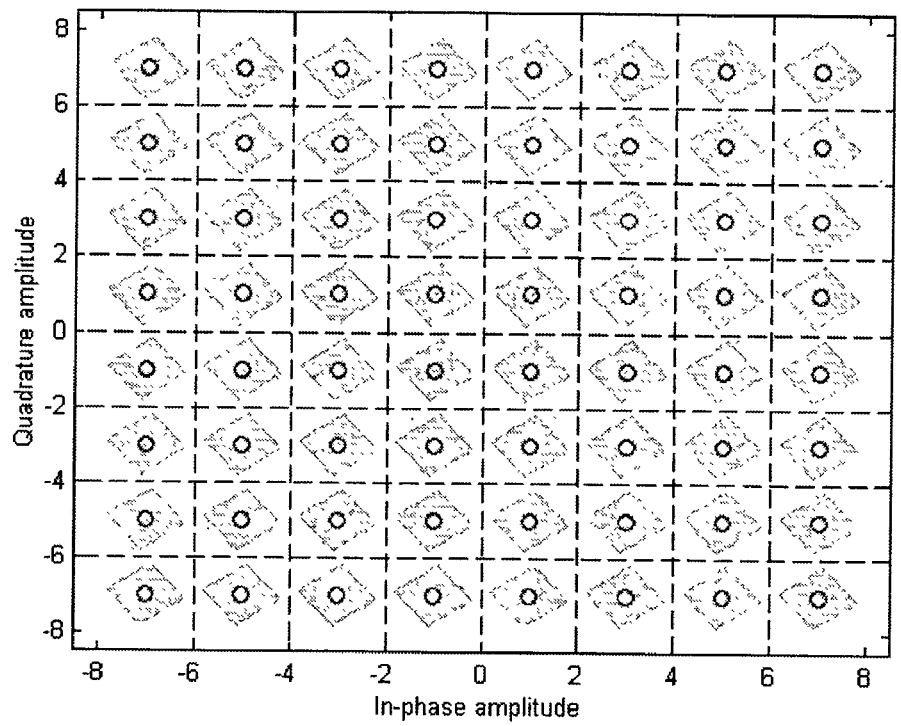
FIG. 2 illustrates the eye diagram of a 64 QAM system with this typical imbalance applied only at the transmitter.
Figure 3:
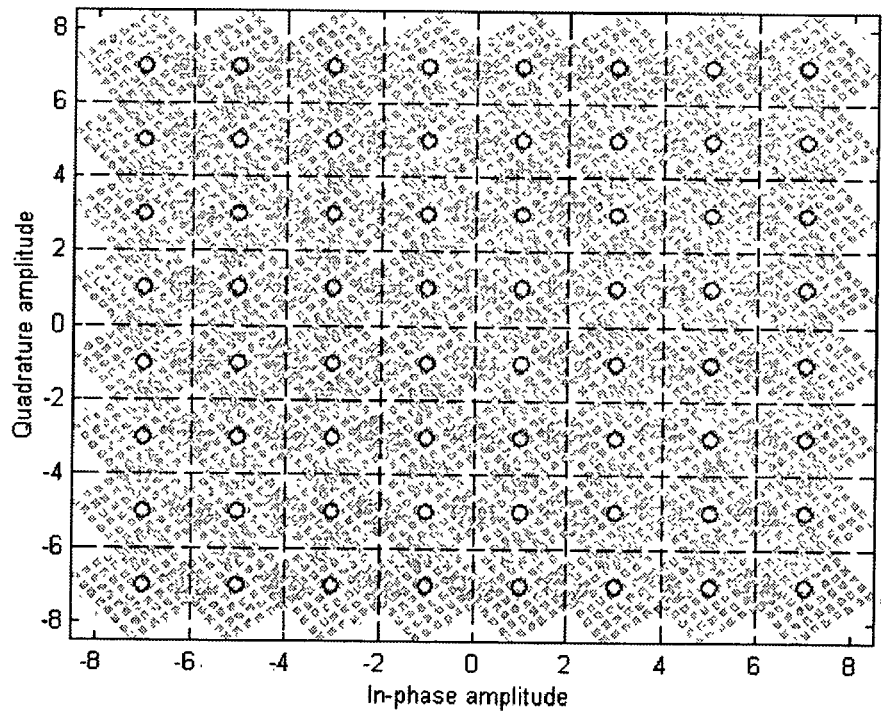
FIG. 3 shows a similar figure but with both the transmitter and receiver suffering 1 dB gain imbalance and 5° phase offset.

The typical mixer imbalance is 1 dB gain imbalance and 5% (or roughly 5°) phase imbalance. FIG. 2 illustrates the eye diagram of a 64 QAM system with this typical imbalance applied only at the transmitter and no other degradations. The dark circles at the center of gray diamonds are the transmitted points and the dashed lines are the decision boundaries. Although there are no decision errors, it is apparent that in a noisy environment, performance is significantly degraded. FIG. 3 shows a similar figure but with both the transmitter and receiver suffering 1 dB gain imbalance and 5° phase offset. The transmitted points again appear as dark circles. Instead of gray diamonds, there are now gray diamonds of diamonds that overlap the decision boundaries. This figure illustrates 320 symbol errors with a 30% error rate. This is an unacceptable error rate.

Equalizer Does Not Average Effects Of Imbalance

If the equalizer is trained on one OFDM symbol, or the same OFDM symbol repeated one or more times, then the effects of imbalance will not be averaged over time and the equalizer taps will be (assuming no noise)

$$\hat{w}_k=\frac{a_k}{\hat{a}_k}=\frac{2}{\alpha(1+\rho_k)+\beta(1-\rho_k)}$$

where $$\rho_k=a^*_{N-k}/a_k$$

is computed based on the training symbol and is thus known a priori and remains constant over the duration of the OFDM packet. The error vector due to the imbalance image for this non-averaging equalizer is then $$\vec{N}_{\alpha\beta}=\hat{a}_k\hat{w}_k-a_k=\frac{(\alpha-\beta)(a^*_{N-k}-a_k\rho_k)}{\alpha(1+\rho_k)+\beta(1-\rho_k)}.$$

Using 802.11a as an example when $\rho_k=\pm 1$, the signal to distortion ratio is $$\gamma_{Imbl}|_{\rho_k=\pm 1}=\frac{1}{2}\left|\frac{\alpha+\beta}{\alpha-\beta}+\rho_k\right|^2\approx\frac{1}{2}\left|\frac{\alpha+\beta}{\alpha-\beta}\right|^2$$

where the approximation is valid because the denominator approaches zero and the numerator approaches two when the imbalance is small rendering the ratio term much larger than ±1.

If only TX imbalance or only RX imbalance is present, then the signal-to-distortion ratio is $$\gamma_{Imbl}|_{TX\text{ only}}\approx\frac{1}{2}\times\frac{1+2G^{tx}_m\cos\theta^{tx}_m+(G^{tx}_m)^2}{1-2G^{tx}_m\cos\theta^{tx}_m+(G^{tx}_m)^2}$$

$$\gamma_{Imbl}|_{RX\text{ only}}\approx\frac{1}{2}\times\frac{1+2G^{rx}_m\cos\theta^{rx}_m+(G^{rx}_m)^2}{1-2G^{rx}_m\cos\theta^{rx}_m+(G^{rx}_m)^2}$$

Therefore, given identical amounts of imbalance, the transmitter and receiver introduce identical amounts of signal distortion. However, when combined, the imbalances may 'align' favorably or unfavorably. For example, given $G^{tx}_m=G^{rx}_m$ and $\theta^{tx}_m=\theta^{rx}_m$, the combined signal-to-distortion ratio is about 6 dB worse than at just the transmitter or receiver. Alternatively, when $$G^{tx}_m=1/G^{rx}_m$$

and $\theta^{tx}_m=-\theta^{rx}_m$, the combined signal-to-distortion ratio is 10-15 dB better than at just the transmitter or receiver for typical values of imbalance and improves considerably as the imbalance decreases.

Equalizer Averages Effects of Imbalance

Given that typically $a_k$ and $a^*_{N-k}$ are uncorrelated and the average $a^*_{N-k}$ is zero, the noise due to imbalance will also be uncorrelated with zero mean. This implies then that the taps of an adaptive frequency domain equalizer, given sufficient time and no other impairments, will converge to $$\hat{w}_k=2/(\alpha+\beta)$$

Comparing these equalizer taps to those of the non-averaging equalizer, it can be observed that the effect of perfect equalizer averaging is to force $\rho_k$ to zero.

Thus, in the case of a perfectly converged, adaptive equalizer, the interference due to the imbalance image can be expressed as an additive error vector:

$$\vec{N}_{\alpha\beta} = \frac{\alpha-\beta}{\alpha+\beta}a_{N-k}^* \text{ for } k=1, 2, \ldots, N-1$$

The average signal-to-distortion ratio due to imbalance is then (assuming $E[a^2_k]=E[a^2_{N-k}]$)

$$\gamma_{Imb} = \frac{E[|a_k|^2]}{E\left[|\vec{N}_{\alpha\beta}|^2\right]} =$$

$$\left(\frac{|\alpha+\beta|}{|\alpha-\beta|}\right)^2 = \frac{[1+G_m^{tx}G_m^{rx}\cos(\theta_m^{tx}-\theta_m^{rx})]^2 + (G_m^{tx}\sin\theta_m^{tx}-G_m^{rx}\sin\theta_m^{rx})^2}{[1-G_m^{tx}G_m^{rx}\cos(\theta_m^{tx}-\theta_m^{rx})]^2 + (G_m^{tx}\sin\theta_m^{tx}+G_m^{rx}\sin\theta_m^{rx})^2}$$

$$\gamma_{Imb}|_{TX \text{ only}} = \frac{1+2G_m^{tx}\cos\theta_m^{tx}+(G_m^{tx})^2}{1-2G_m^{tx}\cos\theta_m^{tx}+(G_m^{tx})^2}$$

$$\gamma_{Imb}|_{RX \text{ only}} = \frac{1+2G_m^{rx}\cos\theta_m^{rx}+(G_m^{rx})^2}{1-2G_m^{rx}\cos\theta_m^{rx}+(G_m^{rx})^2}$$

This result is identical to the result when averaging is not performed, with the exception of the ½ term. Thus, the signal-to-distortion ratio in the case where the equalizer averages the effects of imbalance is 3 dB better than when the equalizer trains on a single OFDM symbol and thus does not average the effects of imbalance. Given that the distribution of $a_k$ is known for each constellation type, the distribution of the noise vectors can also be determined as a function of the imbalance; however, this is not as important as determining the average noise.

The exact number of OFDM symbols over which averaging must be performed in order to average out imbalance depends on the OFDM symbols themselves. Two OFDM symbols are sufficient if, for example, the second symbol is the sign inverted equivalent of the first (i.e. $a_k(m)=-a_k(m+1)$).

Note that the frequency domain equalizer is not capable of compensating for imbalance, although allowing it to average the imbalance effects can reduce the distortion by up to 3 dB.

Figure 4:
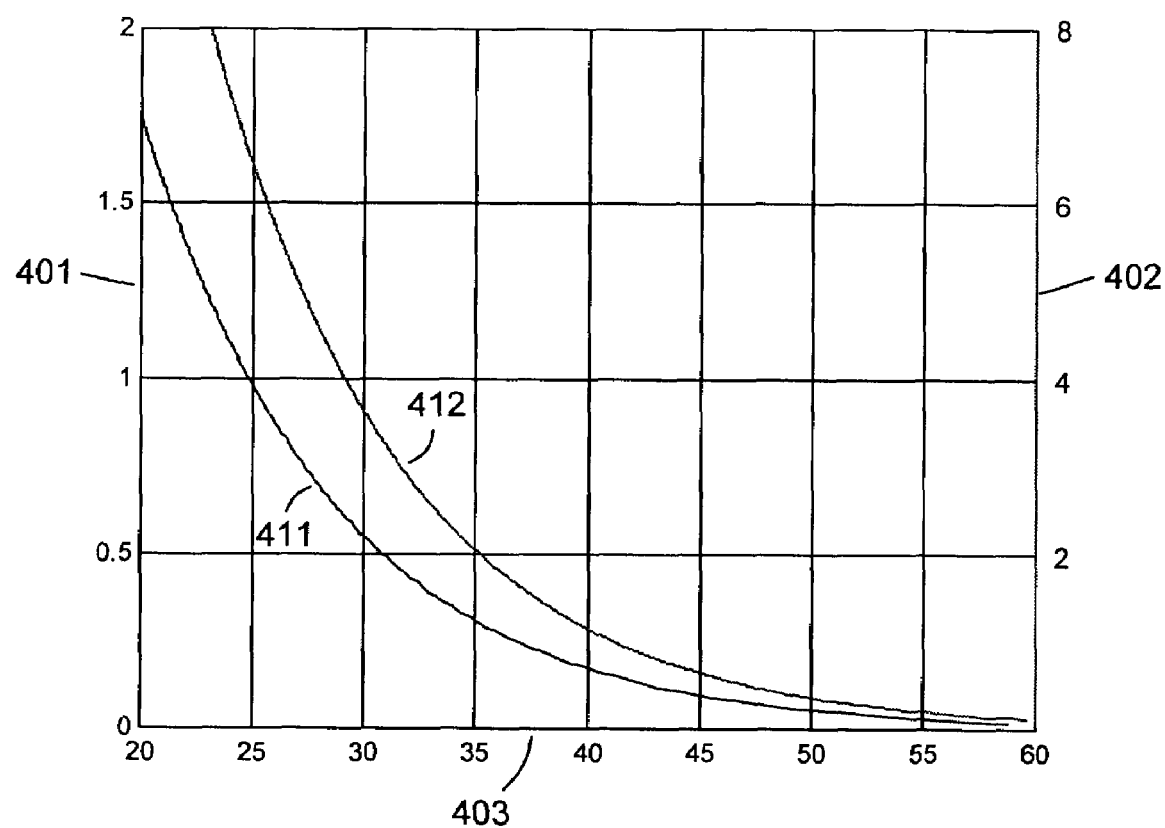
FIG. 4 illustrates the signal-to-distortion ratio for either gain or phase imbalance applied, individually, at either the transmitter or receiver.

FIG. 4 illustrates the signal-to-distortion ratio for either gain or phase imbalance applied, individually, at either the transmitter or receiver. The left hand vertical axis 401 represents gain imbalance only, in dB. The right hand vertical axis 402 represents phase imbalance only, in degrees. The horizontal axis 403 represents a signal-to-distortion ratio in dB. Two curves are plotted for gain 411 and phase 412 imbalance. The results are the same regardless of whether the imbalance is at the transmitter or receiver. The distortion will be worse if both phase and gain imbalance are present or if imbalance is introduced at both the transmitter and receiver.

Multipath Channel

The effect of multipath fading in conjunction with imbalance is now investigated. It is assumed that the delay spread of the channel (including TX/RX filters) is less than the duration of the cyclic prefix (800 nsec for 802.11a) and that any symbol alignment error is sufficiently small such that inter-symbol interference (ISI) is negligible. This model does not incorporate PA non-linearities.

Recall from above that the transmitted RF signal, incorporating transmitter imbalance, is $$z(t)=y_I(t)\cos(2\pi f_c t)-y_Q(t)G^{tx}_m\sin(2\pi f_c t+\theta^{tx}_m)$$

The effect of the multipath channel is that the receiver sees $N_p$ copies of the transmitted signal, each with its own gain $G_p$, delay $t_p$ and phase $\theta_p$, such that $$\hat{z}(t) = \sum_{p=0}^{N_p-1} G_p[y_I(t-t_p)\cos(2\pi f_c(t-t_p)+\theta_p) -$$

$$y_Q(t-t_p)G^{tx}_m\sin(2\pi f_c(t-t_p)+\theta_p+\theta^{tx}_m)]$$

At the receiver, a carrier with a frequency offset of $f_0$ with respect to the transmitter's carrier frequency mixes this signal down to baseband. Because mixing is a linear process, each of the paths can be considered independently as $$\hat{y}_{I,p}(t) = \left\{2G_p\begin{bmatrix}y_I(t-t_p)\cos(2\pi f_c(t-t_p)+\theta_p) - \\ y_Q(t-t_p)G^{tx}_m\sin(2\pi f_c(t-t_p)+ \\ \theta_p+\theta^{tx}_m)\end{bmatrix}\cos(2\pi(f_c+f_o)t)\right\}_{LPF}$$

$$= G_p[y_I(t-t_p)\cos(2\pi f_o t+2\pi f_c t_p-\theta_p) +$$

$$y_Q(t-t_p)G^{tx}_m\sin(2\pi f_o t+2\pi f_c t_p-\theta_p-\theta^{tx}_m)]$$

$$\hat{y}_{Q,p}(t) = \left\{-2G_pG^{rx}_m\begin{bmatrix}y_I(t-t_p)\cos(2\pi f_c(t-\\ t_p)+\theta_p) - y_Q(t- \\ t_p)G^{tx}_m\sin(2\pi f_c(t- \\ t_p)+\theta_p+\theta^{tx}_m)\end{bmatrix}\sin(2\pi(f_c+f_o)t+\theta^{rx}_m)\right\}_{LPF}$$

$$= G_p\begin{bmatrix}y_Q(t-t_p)G^{tx}_m G^{rx}_m\cos(2\pi f_o t+2\pi f_c t_p-\theta_p-\theta^{tx}_m+\theta^{rx}_m) - \\ y_I(t-t_p)G^{rx}_m\sin(2\pi f_o t+2\pi f_c t_p-\theta_p+\theta^{rx}_m)\end{bmatrix}$$

These signals are converted to the digital domain where $$n=i\times f_s-mN_s,$$

$f_s$ is the A/D's sample rate, m is the OFDM symbol number, $$N_s=(N+N_{cp})$$

is the number of samples per OFDM symbol and $N_{cp}$ is the cyclic prefix length. Thus, the received baseband signal from the p-th path is $$\hat{y}_p(n+mN_s) =$$

$$G_p \left\{ \begin{array}{l} y_I(n+mN_s-f_st_p) \begin{bmatrix} \cos(2\pi(n+mN_s)f_o/f_s + 2\pi f_c t_p - \theta_p) - \\ jG_m^{rx}\sin(2\pi(n+mN_s)f_o/f_s + \\ 2\pi f_c t_p - \theta_p + \theta_m^{rx}) \end{bmatrix} + \\ jy_Q(n+mN_s-f_st_p) \begin{bmatrix} G_m^{tx}G_m^{rx}\cos(2\pi(n+mN_s)f_o/f_s + 2\pi f_c t_p - \\ \theta_p - \theta_m^{tx} + \theta_m^{rx}) - jG_m^{tx}\sin(2\pi(n+ \\ mN_s)f_o/f_s + 2\pi f_c t_p - \theta_p - \theta_m^{tx}) \end{bmatrix} \end{array} \right\}$$

Define four time-invariant intermediary values that are functions of the imbalance only (where $\alpha$ and $\beta$ are the same as defined above):

$$\alpha = 1 - jG_m^{rx}\sin(\theta_m^{rx}) \quad \beta = G_m^{tx}G_m^{rx}\cos(\theta_m^{tx} - \theta_m^{rx}) + jG_m^{tx}\sin(\theta_m^{tx})$$

$$\alpha_0 = -jG_m^{rx}\cos(\theta_m^{rx}) \quad \beta_0 = G_m^{tx}G_m^{rx}\sin(\theta_m^{tx} - \theta_m^{rx}) - jG_m^{tx}\cos(\theta_m^{tx})$$

Rewriting the received baseband signal in terms of these intermediary values and assuming that ISI is not an issue (i.e. that $$f_s \times \max(t_p) \leq N_{cp}$$

and ignoring TX/RX filtering effects), the baseband model incorporating imbalance, multipath and frequency offset is obtained:

$$\hat{y}_m(n) =$$

$$\sum_{p=0}^{N_p-1} G_p \left\{ \begin{array}{l} y_{m,I}(n-f_st_p) \begin{bmatrix} \alpha\cos(2\pi(n+mN_s)f_o/f_s + 2\pi f_c t_p - \theta_p) + \\ \alpha_0\sin(2\pi(n+mN_s)f_o/f_s + \\ 2\pi f_c t_p - \theta_p) \end{bmatrix} + \\ jy_{m,Q}(n-f_st_p) \begin{bmatrix} \beta\cos(2\pi(n+mN_s)f_o/f_s + 2\pi f_c t_p - \\ \theta_p) + \beta_0\sin(2\pi(n+ \\ mN_s)f_o/f_s + 2\pi f_c t_p - \theta_p) \end{bmatrix} \end{array} \right\}$$

The received set of constellation points for the m-th symbols is obtained by performing the FFT on $\hat{y}_{m,p}(n)$. Exploiting the linearity of the FFT, superposition can be applied (where the subscript m has been dropped for convenience)

$$\hat{a}_k = \Im\left\{ \sum_{p=0}^{N_p-1} \hat{y}_p(n) \right\} = \sum_{p=0}^{N_p-1} \Im\{\hat{y}_p(n)\}$$

where $\Im\{\bullet\}$ is the Fourier transform. Now, rearranging $\hat{y}_p(n)$ such that $$\hat{y}(n-f_st_p) =$$

$$\sum_{p=0}^{N_p-1} G_p \left\{ \begin{array}{l} \cos(2\pi n f_o/f_s + 2\pi m N_s f_o/f_s + 2\pi(f_c+f_o)t_p - \\ \theta_p)[\alpha y_I(n) + j\beta y_Q(n)] + \sin(2\pi n f_o/f_s + 2\pi m N_s f_o/f_s + \\ 2\pi(f_c+f_o)t_p - \theta_p)[\alpha_0 y_I(n) + j\beta_0 y_Q(n)] \end{array} \right\}$$

the delay property of the Fourier transform, where $n_0$ is non-integer, $$f(n-n_0) \leftrightarrow \exp(-j2\pi k n_0/N) F(k) \text{ for } k \leq N/2$$

and $$f(n-n_0) \leftrightarrow \exp(-j2\pi n_0(k-N)/N) F(k) \text{ for } k > N/2,$$

can be applied $$\hat{a}_k = \begin{cases} \sum_{p=0}^{N_p-1} \exp(-j2\pi f_s t_p k/N) \Im\{\hat{y}_p(n)\} & k \leq N/2 \\ \sum_{p=0}^{N_p-1} \exp(-j2\pi f_s t_p (k-N)/N) \Im\{\hat{y}_p(n)\} & k > N/2 \end{cases}$$

Recognizing that $\Im\{\hat{y}_p(n)\}$ is the sum of two products, the Fourier transform's modulation property can be used—if $y(n)=h(n)x(n)$, then $$Y(k) = H(k) * X(k) = N^{-1} \sum_{n=0}^{N-1} H(n)X(k-n)$$

where * represents circular convolution. Now define $$\theta = 2\pi m N_s f_o/f_s + 2\pi(f_o+f_c)t_p - \theta_p$$

which is constant over each symbol, and using the definition of the discrete Fourier transform, $$\Im\{\cos(2\pi n f_o/f_s + \theta)\} = \sum_{n=0}^{N-1} \cos(2\pi n f_o/f_s + \theta) e^{-j2\pi nk/N}$$

$$\Im\{\sin(2\pi n f_o/f_s + \theta)\} = \sum_{n=0}^{N-1} \sin(2\pi n f_o/f_s + \theta) e^{-j2\pi nk/N}$$

The Fourier transform of $\alpha y_I(n)+j\beta y_Q(n)$ was derived above and the Fourier transform of $\alpha_0 y_I(n)+j\beta_0 y_Q(n)$ is a trivial variation of this. Thus, (assuming $\alpha_0$ is zero)

$$\Im\{\hat{y}_p(n)\} = \frac{G_p}{2N} \sum_{n=1}^{N-1} \left\{ \begin{array}{l} [(\alpha+\beta)a_n + \\ (\alpha-\beta)a_{N-n}^*] \sum_{n'=0}^{N-1} \cos(2\pi n' f_o/f_s + \theta) e^{-j2\pi n'(k-n)/N} + \\ [(\alpha_0+\beta_0)a_n + \\ (\alpha_0-\beta_0)a_{N-n}^*] \sum_{n'=0}^{N-1} \sin(2\pi n' f_o/f_s + \theta) e^{-j2\pi n'(k-n)/N} \end{array} \right\}$$

Finally, substituting back into the original equation, the final result is obtained (for $$k \leq N/2;$$

see the delay property above for the modification required for the $$k > N/2$$

case)

$$\hat{a}_k = \frac{1}{2N} \sum_{p=0}^{N_p-1} G_p e^{-j2\pi f_s t_p k/N} \sum_{n=1}^{N-1} \left\{ \begin{array}{l} [(\alpha+\beta)a_n + \\ (\alpha-\beta)a_{N-n}^*] \sum_{n'=0}^{N-1} \cos(2\pi n' f_o/f_s + \theta) e^{-j2\pi n'(k-n)/N} + \\ [(\alpha_0+\beta_0)a_n + \\ (\alpha_0-\beta_0)a_{N-n}^*] \sum_{n'=0}^{N-1} \sin(2\pi n' f_o/f_s + \theta) e^{-j2\pi n'(k-n)/N} \end{array} \right\}$$

Again, it is assumed that the frequency offset is negligible and thus can be assumed to be zero. In this case, the above equation simplifies to $$\hat{a}_k = \begin{cases} \frac{1}{2} \sum_{p=0}^{N_p-1} G_p \exp(-j2\pi f_s t_p k/N) \left\{ \begin{array}{l} \cos(\theta)[(\alpha+\beta)a_k + (\alpha-\beta)a_{N-k}^*] + \\ \sin(\theta)[(\alpha_0+\beta_0)a_k + (\alpha_0-\beta_0)a_{N-k}^*] \end{array} \right\} & 0 \le k < N/2 \\ \frac{1}{2} \sum_{p=0}^{N_p-1} G_p \exp(-j2\pi f_s t_p(k-N)/N) \left\{ \begin{array}{l} \cos(\theta)[(\alpha+\beta)a_k + (\alpha-\beta)a_{N-k}^*] + \\ \sin(\theta)[(\alpha_0+\beta_0)a_k + (\alpha_0-\beta_0)a_{N-k}^*] \end{array} \right\} & N/2 \le k < N \end{cases}$$

To simplify the notation going forward and to assist in separating the channel effects from the imbalance effects, the following functions are defined (not that these are functions of the multipath channel only and are assumed constant over the duration of the packet)

$$A_{\cos} = \begin{cases} \sum_{p=0}^{N_p-1} G_p \exp(-j2\pi f_s t_p k/N) \cos(\theta) & 0 \le k < N/2 \\ \sum_{p=0}^{N_p-1} G_p \exp(-j2\pi f_s t_p(k-N)/N) \cos(\theta) & N/2 \le k < N \end{cases}$$

$$A_{\sin} = \begin{cases} \sum_{p=0}^{N_p-1} G_p \exp(-j2\pi f_s t_p k/N) \sin(\theta) & 0 \le k < N/2 \\ \sum_{p=0}^{N_p-1} G_p \exp(-j2\pi f_s t_p(k-N)/N) \sin(\theta) & N/2 \le k < N \end{cases}$$

Thus, rewriting the above expression, $$\hat{a}_k = \frac{1}{2}[(\alpha+\beta)A_{\cos} + (\alpha_0+\beta_0)A_{\sin}]a_k + \frac{1}{2}[(\alpha-\beta)A_{\cos} + (\alpha_0-\beta_0)A_{\sin}]a_{N-k}^*$$

Again, assuming that $a_k$ and $a^*_{N-k}$ are uncorrelated, randomly distributed and of zero mean, a frequency domain equalizer allowed to average over a sufficient number of OFDM symbols will converge to $$\hat{w}_k = 2/[(\alpha+\beta)A_{\cos} + (\alpha_0+\beta_0)A_{\sin}].$$

The error vector in this case is $$\vec{N}_{\alpha\beta} = \hat{a}_k \hat{w}_k - a_k = \epsilon_k a^*_{N-k}$$

where $$\epsilon_k = \frac{(\alpha-\beta)A_{\cos} + (\alpha_0-\beta_0)A_{\sin}}{(\alpha+\beta)A_{\cos} + (\alpha_0+\beta_0)A_{\sin}}$$

Notice that the error vector will be zero only if $a^*_{N-k}=0$. The parameter, $\epsilon_k$, is of particular importance as it will be used extensively. It is a constant value, independent of the transmitted data, which incorporates all the channel and imbalance parameters (i.e. separates the channel and imbalance effects from the data effects).

When the frequency domain equalizer is trained on a single or repeated OFDM reference symbol (such as for 802.11a systems), the equalizer coefficients will be (assuming no noise)

$$\hat{w}_k = \frac{2}{[(\alpha+\beta)A_{\cos} + (\alpha_0+\beta_0)A_{\sin}] + \rho_k[(\alpha-\beta)A_{\cos} + (\alpha_0-\beta_0)A_{\sin}]}$$

where $$\rho_k = a^*_{N-k}/a_k$$

is determined from the reference signal used for training the equalizer. In this case, the error vector is $$\vec{N}_{\alpha\beta} = \hat{a}_k \hat{w}_k - a_k = \frac{\epsilon_k(a^*_{N-k} - a_k \rho_k)}{1 + \rho_k \epsilon_k}$$

Notice that the error vector is zero whenever $a_k \rho_k = a^*_{N-k}$. Using the same approach as for the no channel case, it can be shown that averaging the imbalance effects over multiple OFDM symbols results in up to 3 dB reduction in the average distortion power.

Imbalance Compensation Algorithms

Several algorithms for compensating imbalance have been developed. These are focused in the following areas of pre-compensating TX imbalance at the transmitter, compensating for TX and RX imbalance at the receiver—no channel, compensating for TX and RX imbalance at the receiver—fading channel. Two variations for the fading channel case have been considered: (a) compensating for TX imbalance at the receiver, ignoring RX imbalance, and (b) compensating for RX imbalance at the receiver, ignoring TX imbalance. These two variations are of interest because at the receiver, the RX imbalance will be the same (or very slowly changing) over all packets whereas the TX imbalance may change from packet to packet (particularly for a base station or wireless access point).

Even when imbalance compensation is applied, some residual imbalance effects may still exist particularly if the previously imbalance measurement is not accurate or the imbalance varies over time. Here, iterative imbalance compensator coefficients are computed such that the coefficients can be updated to compensate for any such residual imbalance. Sufficiently averaging the imbalance measurements over time could negate the need to iteratively update the coefficients. However, this would require that either the imbalance compensation not be applied during this measurement period or that the measurement be performed prior to any compensation. Algorithms for estimating the imbalance are presented below.

Pre-Compensating TX Imbalance at the Transmitter

The transmit I/Q Imbalance Compensator is implemented at the transmitter and pre-compensates for I/Q imbalance introduced by the transmit mixer (see FIG. 1).

TX imbalance compensation can be applied in either the time or frequency domain. Both are relatively simple algorithms to implement; however, if not all samples originate in the frequency domain, then the time-domain approach is preferable. For example, in 802.11a, to reduce the transmitter's wake-up latency, the short preamble is stored in memory as time-domain samples, In this case, a time-domain TX imbalance compensator is preferred unless the preamble samples are compensated before they are committed to memory.

Time-Domain Compensation

Compensating for TX I/Q imbalance in the time-domain at the transmitter requires that y(n) be computed as a function of x(n) such that $\hat{y}(n)=x(n)$, where all but the transmitter imbalance impairments are zero. Using equations derived above, this implies that $$\hat{y}_I(n)=y_I(n)-y_Q(n)G^{tx}_m \sin\theta^{tx}_m = x_I(n)$$

$$\hat{y}_Q(n)=y_Q(n)G^{tx}_m \cos\theta^{tx}_m = x_Q(n)$$

Solving these equations for $y_I(n)$ and $y_Q(n)$ as a function of $x_I(n)$ and $x_Q(n)$, the functionality of the time-domain transmit I/Q imbalance compensator is determined:

$$y_I(n)=x_I(n)+x_Q(n)\tan(\theta^{tx}_m)$$

$$y_Q(n)=x_Q(n)[G^{tx}_m \cos(\theta^{tx}_m)]^{-1}$$

This assumes that $G^{tx}_m$ and $\theta^{tx}_m$ are perfectly known and time-invariant. However, in practice, typically only estimates of $G^{tx}_m$ and $\theta^{tx}_m$ are known. Fortunately, one can iteratively update these values given new estimates. For example, $$G^{tx}_m(i+1)=G^{tx}_m(i)\hat{G}^{tx}_m$$

and $$\theta^{tx}_m(i+1)=\theta^{tx}_m(i)+\hat{\theta}^{tx}_m$$

where $\hat{G}^{tx}_m(i)$ and $\hat{\theta}^{tx}_m(i)$ are the i-th estimates of the residual gain and phase imbalance and $$G^{tx}_m(0)=1$$

and $$\theta^{tx}_m(0)=0.$$

Frequency-Domain Compensation

Because TX imbalance is introduced prior to the channel and far-end receiver, the results of above can be used where the RX imbalance is zero. In other words $$\hat{a}_k|_{TX\ only} = \frac{1+\beta}{2}a_k + \frac{1-\beta}{2}a^*_{N-k} \quad k=1,2,\ldots,N-1$$

where $$\beta=G^{tx}_m \exp(j\theta^{tx}_m).$$

If the compensator output is $\underline{a}_k$, then it must compute $\underline{a}_k$ from $a_k$ such that $\hat{\underline{a}}_k=a_k$. Mathematically, using the equations derived above, this implies that $$\hat{\underline{a}}_k = \frac{1+\beta}{2}\underline{a}_k + \frac{1-\beta}{2}\underline{a}^*_{N-k} \equiv a_k$$

$$\hat{\underline{a}}_{N-k} = \frac{1+\beta}{2}\underline{a}_{N-k} + \frac{1-\beta}{2}\underline{a}^*_k \equiv a_{N-k}$$

Solving these equations for $\underline{a}_k$ as a function of $a_k$, the functionality of the frequency domain transmit I/Q imbalance compensator is determined:

$$\underline{a}_k=C_1 a_k + C_2 a^*_{N-k}$$

$$C_1 = \frac{1+\beta^*}{\beta+\beta^*} \quad \text{and} \quad C_2 = -\frac{1-\beta}{\beta+\beta^*}$$

These coefficients can be scaled by any complex value provided that both are scaled by the same value. For example, $C_1$ and $C_2$ can be scaled by $1/C_1$ to simplify implementation. This will alter the eventual signal power but given that $C_1$ is typically close to 1, this may be acceptable. The frequency domain equalizer at the receiver will automatically compensate for any such scaling.

Above, it is assumed that $\beta$ is time-invariant and known exactly; however, typically only an estimate, $\hat{\beta}$ is known.

Thus, the compensator will not fully correct for all imbalance and some residual imbalance effects will remain. Using this estimate in the coefficients and computing the received points, $$\hat{a}_k|_{TX\ only} = \frac{1+\beta_\Delta}{2}a_k + \frac{1-\beta_\Delta}{2}a^*_{N-k} \text{ where } \beta_\Delta = \frac{\hat{\beta}^*+2\beta-\hat{\beta}}{\hat{\beta}^*+\hat{\beta}}$$

Thus, $\beta_{66}$ is the residual offset that can be compensated for by either concatenating a second compensator to the original or by updating the original coefficients to include the residual offset. The latter approach is preferred as it allows a single compensator to be continuously updated whenever a new residual TX imbalance estimate is obtained. Applying the output of the first compensator to the input of the second compensator and then rearranging the resulting equation to get a single compensator, the coefficient update using algorithm is obtained:

$$C_1(i+1) = C_1(i)\frac{1+\hat{\beta}^*(i)}{\hat{\beta}(i)+\hat{\beta}^*(i)} - C_2^*(i)\frac{1-\hat{\beta}(i)}{\hat{\beta}(i)+\hat{\beta}^*(i)}$$

$$C_2(i+1) = C_2(i)\frac{1+\hat{\beta}^*(i)}{\hat{\beta}(i)+\hat{\beta}^*(i)} - C_1^*(i)\frac{1-\hat{\beta}(i)}{\hat{\beta}(i)+\hat{\beta}^*(i)}$$

where $$C_1(0)=1,\ C_2(0)=0$$

and $\hat{\beta}(i)$ is the i-th estimate of the residual TX imbalance. This was computed by considering two concatenated compensators and determining the equivalent coefficients for a combined compensator.

Compensating For TX and RX Imbalance At The Receiver—No Channel

In this section, an algorithm is developed to compensate for imbalance introduced by both the far-end transmit mixer and the near-end receive mixer. It is assumed that there is no channel, enabling the use of results from above.

Compensation can be performed both in the time-domain and frequency-domain. Both approaches are developed here; however, the time-domain approach is preferred because it can be applied immediately after the A/D converters, minimizing the effects of imbalance on frequency offset estimation and symbol synchronization. The time-domain approach may also be less complex to implement. Note, this approach is not illustrated in FIG. 1 because in practice, there will always be some channel, in which case it is not practical to perform TX imbalance compensation in the time-domain.

The results of this section can be adapted for the cases of TX imbalance or RX imbalance only. If TX imbalance is zero, then $G^{tx}_m=1$, $\theta^{tx}_m=0$, $$\alpha=1-jG^{rx}_m\sin\theta^{rx}_m$$

and $\beta=G^{rx}_m\cos\theta^{rx}_m$. Similarly, if RX imbalance is zero, then $G^{rx}_m=1$, $\theta^{rx}_m=0$, $\alpha=1$ and $$\beta=G^{tx}_m\exp(j\theta^{tx}_m)$$

Time-Domain Compensation

The time-domain TX/RX imbalance compensator must compute $\hat{x}(n)$ from $\hat{y}(n)$ such that $\hat{x}(n)=y(n)$, where all but the transmitter and receiver imbalance impairments are zero. Using the equations from above, this implies that $$\hat{y}_I(n)=y_I(n)-y_Q(n)G^{rx}_m\sin(\theta^{rx}_m)\equiv\hat{x}_I(n)-\hat{x}_Q(n)G^{rx}_m\sin(\theta^{rx}_m)$$

$$\hat{y}_Q(n)=y_Q(n)G^{rx}_mG^{tx}_m\cos(\theta^{tx}_m-\theta^{rx}_m)-y_I(n)G^{rx}_m\sin(\theta^{rx}_m)\equiv\hat{x}_Q(n)G^{rx}_mG^{tx}_m\cos(\theta^{tx}_m-\theta^{rx}_m)-\hat{x}_I(n)G^{rx}_m\sin(\theta^{rx}_m)$$

Solving these equations for $\hat{x}_I(n)$ and $\hat{x}_Q(n)$ as a function of $\hat{y}_I(n)$ and $\hat{y}_Q(n)$, the functionality of the transmit I/Q imbalance compensator is determined (i.e. by rearranging the equation for $\hat{y}_I(n)$ to get expressions for $\hat{x}_I(n)$ and $\hat{x}_Q(n)$ and then substituting these two expressions back into the equation for $\hat{y}_Q(n)$ and simplifying)

$$\hat{x}_I(n)=C_{II}\hat{y}_I(n)+C_{IQ}\hat{y}_Q(n)$$

and $$\hat{x}_Q(n)C_{QI}\hat{y}_I(n)+C_{QQ}\hat{y}_Q(n)$$

where the compensator coefficients are $$C_{II} = \frac{G^{tx}_mG^{rx}_m\cos(\theta^{tx}_m-\theta^{rx}_m)}{G^{tx}_mG^{rx}_m\cos(\theta^{tx}_m)\cos(\theta^{rx}_m)},\ C_{IQ} = \frac{G^{rx}_m\sin(\theta^{tx}_m)}{G^{tx}_mG^{rx}_m\cos(\theta^{tx}_m)\cos(\theta^{rx}_m)}$$

$$C_{QI} = \frac{G^{rx}_m\sin(\theta^{rx}_m)}{G^{tx}_mG^{rx}_m\cos(\theta^{tx}_m)\cos(\theta^{rx}_m)},$$

$$C_{QQ} = \frac{1}{G^{tx}_mG^{rx}_m\cos(\theta^{tx}_m)\cos(\theta^{rx}_m)}$$

These coefficients can be rewritten in terms of $\alpha$ and $\beta$ as follows:

$$C_{II} = \frac{\text{Re}[\beta]}{\text{Re}[\beta]+\text{Im}[\alpha]\text{Im}[\beta]},$$

$$C_{IQ} = \frac{\text{Im}[\beta]}{\text{Re}[\beta]+\text{Im}[\alpha]\text{Im}[B]}$$

$$C_{QI} = \frac{-\text{Im}[\alpha]}{\text{Re}[\beta]+\text{Im}[\alpha]\text{Im}[\beta]},$$

$$C_{QQ} = \frac{1}{\text{Re}[\beta]+\text{Im}[\alpha]\text{Im}[\beta]}$$

Note that the denominator can typically be ignored because it is the same for all terms and thus the equalizer will compensate for it.

In real life, $\alpha$ and $\beta$ will not be known exactly, but rather estimated as $\hat{\alpha}$ and $\hat{\beta}$. This results in residual offset which can be estimated and characterized by $\hat{\alpha}_\Delta$ and $\hat{\beta}_\Delta$. To determine how to update the original compensator coefficients such that the residual offset is also compensated for, consider the equivalent scenario where a second I/Q imbalance compensator immediately follows the first, where the first operates on $\hat{\alpha}$ and $\hat{\beta}$ and the second on $\hat{\alpha}_\Delta$ and $\hat{\beta}_\Delta$. By mathematically combining theses two compensators such that the output of the first feeds into the input of the next, an equivalent set of coefficients can be determined. This leads to the following recursive (or iterative) format $$C_{II}(i+1) = \frac{\text{Re}[\hat{\beta}(i)]C_{II}(i) + \text{Im}[\hat{\beta}(i)]C_{QI}(i)}{\text{Re}[\hat{\beta}(i)] + \text{Im}[\hat{\alpha}(i)]\text{Im}[\hat{\beta}(i)]},$$

$$C_{IQ}(i+1) = \frac{\text{Re}[\hat{\beta}(i)]C_{IQ}(i) + \text{Im}[\hat{\beta}(i)]C_{QQ}(i)}{\text{Re}[\hat{\beta}(i)] + \text{Im}[\hat{\alpha}(i)]\text{Im}[\hat{\beta}(i)]}$$

$$C_{QI}(i+1) = \frac{C_{QI}(i) - \text{Im}[\hat{\alpha}(i)]C_{II}(i)}{\text{Re}[\hat{\beta}(i)] + \text{Im}[\hat{\alpha}(i)]\text{Im}[\hat{\beta}(i)]},$$

$$C_{QQ}(i+1) = \frac{C_{QQ}(i) - \text{Im}[\hat{\alpha}(i)]C_{IQ}(i)}{\text{Re}[\hat{\beta}(i)] + \text{Im}[\hat{\alpha}(i)]\text{Im}[\hat{\beta}(i)]}$$

where $$C_{II}(0)=1,\ C_{IQ}(0)=0,\ C_{QI}(0)=0,\ C_{QQ}(0)=1$$

and $\hat{\alpha}(i)$ and $\hat{\beta}(i)$ are the i-th estimates of the residual imbalance. Again the denominator can be ignored provided that the frequency domain equalizer is adaptive or the error is deemed negligible.

Frequency-Domain Compensation

Recall from above that there are two versions of the equalized frequency domain output depending on whether or not the equalizer averages out the effects of imbalance by training over a sufficient number of unique OFDM symbols. Accordingly, each version of equalizer has a corresponding TX/RX imbalance compensator algorithm.

Equalizer Does Not Average Effects Of Imbalance

The equalizer output assuming that the effects of imbalance have not been averaged (i.e. equalizer trained on one symbol or one repeating symbol) is $$\hat{a}_{k,eq} = \frac{(\alpha+\beta)a_k + (\alpha-\beta)a^*_{N-k}}{\alpha(1+\rho_k) + \beta(1-\rho_k)}$$

where $$\rho_k = a^*_{N-k}/a_k$$

is computed from the training symbol.

The TX/RX IQ imbalance compensator produces the compensated output $a_k$ from the two inputs $\hat{a}_{k,eq}$ and $\hat{a}_{N-k,eq}$.

The compensation algorithm can be obtained by rearranging $\hat{a}_{k,eq}$ and $\hat{a}_{N-k,eq}$ to get two expressions for $a^*_{N-k}$ which can be equated such that the solution for $a_k$ as a function of $\hat{a}_{k,eq}$ and $\hat{a}_{N-k,eq}$ can be obtained:

$$a_k = C_1 \hat{a}_{k,eq} + C_2 \hat{a}^*_{N-k,eq}$$

$$C_1 = \frac{\alpha(1+\rho_k) + \beta(1-\rho_k)}{2(\alpha\beta^* + \beta\alpha^*)}(\alpha^* + \beta^*)$$

and $$C_2 = \frac{\alpha^*(1+\rho^*_{N-k}) + \beta^*(1-\rho^*_{N-k})}{2(\alpha\beta^* + \beta\alpha^*)}(\alpha - \beta)$$

Notice that if the training signal is BPSK (as in 802.11a), $\rho_k = \rho^*_{N-K} = \pm 1$.

In real life, $\alpha$ and $\beta$ will be estimated as $\hat{\alpha}$ and $\hat{\beta}$ resulting in some residual offset after compensation characterized by $\alpha_\Delta$ and $\beta_\Delta$. This residual offset can be compensated for by concatenating a second imbalance compensator to the first, where the first operates on $\hat{\alpha}$ and $\hat{\beta}$ and the second on $\hat{\alpha}_\Delta$ and $\hat{\beta}_\Delta$. By mathematically combining these two compensators such that the output of the first feeds into the input of the next, an equivalent set of coefficients can be determined. This of course leads to the following recursive (or iterative) format $$C_1(i+1) = C_1(i)\frac{\hat{\alpha}(i)(1+\rho_k) + \hat{\beta}(i)(1-\rho_k)}{2(\hat{\alpha}(i)\hat{\beta}^*(i) + \hat{\beta}(i)\hat{\alpha}^*(i))}(\hat{\alpha}^*(i) + \hat{\beta}^*(i)) -$$
$$C_2^*(i)\frac{\hat{\alpha}^*(i)(1+\rho^*_{N-k}) + \hat{\beta}^*(i)(1-\rho^*_{N-k})}{2(\hat{\alpha}(i)\hat{\beta}^*(i) + \hat{\beta}(i)\hat{\alpha}^*(i))}(\hat{\alpha}(i) - \hat{\beta}(i))$$

$$C_2(i+1) = C_2(i)\frac{\hat{\alpha}(i)(1+\rho_k) + \hat{\beta}(i)(1-\rho_k)}{2(\hat{\alpha}(i)\hat{\beta}^*(i) + \hat{\beta}(i)\hat{\alpha}^*(i))}(\hat{\alpha}^*(i) + \hat{\beta}^*(i)) -$$
$$C_1^*(i)\frac{\hat{\alpha}^*(i)(1+\rho^*_{N-k}) + \hat{\beta}^*(i)(1-\rho^*_{N-k})}{2(\hat{\alpha}(i)\hat{\beta}^*(i) + \hat{\beta}(i)\hat{\alpha}^*(i))}(\hat{\alpha}(i) - \hat{\beta}(i))$$

where $$C_1(0)=1,\ C_2(0)=0$$

and $\hat{\alpha}(i)$ and $\hat{\beta}(i)$ are the i-th estimates of the residual imbalance.

Alternatively, given that the equalizer does not average the effects of imbalance, the equalizer taps can be adjusted such that this averaging effect is mimicked. For example, $$w_k^{(ave)} = w_k \frac{\alpha + \beta}{\alpha(1-\rho_k) + \beta(1+\rho_k)}$$

This allows for the imbalance compensator based on an equalizer that averages the effects of imbalance to be used.

Equalizer Averages Effects Of Imbalance

An equalizer that averages the frequency domain distortion due to imbalance is effectively averaging $\rho_k$ such that it tends towards zero. Thus by simply forcing $\rho_k=0$, $$a_k C_1 \hat{a}_{k,eq} + C_2 \hat{a}^*_{N-k,eq}$$

$$C_1(i+1) = C_1(i)\frac{(\hat{\alpha}(i)+\hat{\beta}(i))(\hat{\alpha}^*(i)+\hat{\beta}^*(i))}{2(\hat{\alpha}(i)\hat{\beta}^*(i)+\hat{\beta}(i)\hat{\alpha}^*(i))} - C_2^*(i)\frac{(\hat{\alpha}(i)-\hat{\beta}(i))(\hat{\alpha}^*(i)+\hat{\beta}^*(i))}{2(\hat{\alpha}(i)\hat{\beta}^*(i)+\hat{\beta}(i)\hat{\alpha}^*(i))}$$

$$C_2(i+1) = C_2(i)\frac{(\hat{\alpha}(i)+\hat{\beta}(i))(\hat{\alpha}^*(i)+\hat{\beta}^*(i))}{2(\hat{\alpha}(i)\hat{\beta}^*(i)+\hat{\beta}(i)\hat{\alpha}^*(i))} - C_1^*(i)\frac{(\hat{\alpha}(i)-\hat{\beta}(i))(\hat{\alpha}^*(i)+\hat{\beta}^*(i))}{2(\hat{\alpha}(i)\hat{\beta}^*(i)+\hat{\beta}(i)\hat{\alpha}^*(i))}$$

where $$C_1(0)=1, C_2(0)=0$$

and $\hat{\alpha}(i)$ and $\hat{\beta}(i)$ are the i-th estimates of the residual imbalance.

Alternatively, if the equalizer averages the effects of imbalance, the equalizer taps could be adjusted for the imbalance effects such that this averaging effect is removed. For example, if the averaged equalizer taps are $w^{(ave)}_k$, then the corresponding non-averaged taps are $$w_k = w_k^{(ave)} \frac{\alpha(1-\rho_k)+\beta(1+\rho_k)}{\alpha+\beta}$$

where $\rho_k$ can be arbitrarily selected. This allows for the imbalance compensator based on an equalizer that does not average imbalance to be used.

Compensating For TX and RX Imbalance At The Receiver—Fading Channel

In this section, algorithms are developed for compensating for imbalance introduced at the far-end transmitter and near-end receiver when a fading channel is present. Thus, the equations developed in the multipath channel discussion above are used.

Time-Domain Compensation

The fading channel imparts a frequency dependency on the effects of the TX imbalance. This frequency dependency makes it very difficult, if not impossible, to compensate for the TX imbalance in the time-domain at the receiver. Because the RX imbalance is applied after the fading channel in the receiver, it can be removed in the time domain, but a combined TX/RX time-domain compensator is most likely not feasible, except in limited circumstances utilizing predetermined test symbol(s) and substantially noise free communications channels, which does not include the case of a fading channel.

In particular, the effect of the multipath channel is to multiply each sub-carrier by some complex value representing the gain and phase rotation of the channel at that sub-carrier's frequency. Because the TX imbalance is added before the fading channel and results in a linear combination of two frequencies, in order to remove it at the receiver, the channel's effects on those two frequencies must be removed first. This implies that in order to perform time-domain imbalance compensation, a time-domain channel equalizer must be applied first. Not only is this very complex, but it also defeats one of the advantages of OFDM systems and that is the ease of channel equalization in the frequency domain.

Frequency-Domain Compensation

Both equalizer cases are considered here. In the first case, the equalizer is trained on one OFDM symbol or one repeating OFDM symbol such that the effects of imbalance are not averaged. In the second case, the equalizer trains over a sufficient number of OFDM symbols such that the effects of imbalance are averaged out.

Recall from above that the effects of TX imbalance are affected by the channel and thus difficult to compensate in the time-domain. The converse is true in the frequency domain. In the frequency-domain, the equalizer removes the effects of the channel enabling frequency-independent TX compensation; however, the equalizer applies the inverse channel to the RX imbalance requiring that RX imbalance compensation be frequency-dependent.

Note that if frequency-domain compensation is used in conjunction with an adaptive equalizer (decision directed or not), the TX imbalance compensation must be done after equalizer compensation but before equalizer adaptation (i.e. the imbalance compensated values should be passed to the equalizer's update algorithm). This ensures that the channel effects are removed prior to compensation but also ensures that the equalizer does not try to train on pre-compensated samples.

Equalizer Does Not Average Effects Of Imbalance

The equalizer output is (without averaging)

$$\hat{a}_{k,eq} = \hat{a}_k w_k = \frac{a_k + a^*_{N-k}\varepsilon_k}{1+\rho_k \varepsilon_k}$$

where $$\varepsilon_k = \frac{(\alpha-\beta)A_{\cos}+(\alpha_0-\beta_0)A_{\sin}}{(\alpha+\beta)A_{\cos}+(\alpha_0+\beta_0)A_{\sin}}$$

Because the $A_{cos}$ and $A_{sum}$ channel terms can not be separated from the imbalance terms, in order to compensate for the imbalance, the channel effects will have to be accounted for. Fortunately, $\epsilon_k$ is independent of the transmitted data and thus, in a stationary channel, will remain constant over the duration of a packet transmission.

The TX/RX IQ imbalance compensator produces the compensated output $a_k$ from the two inputs, $\hat{a}_{k,eq}$ and $\hat{a}_{N-k,eq}$.

The compensation algorithm can be obtained by rearranging $\hat{a}_{k,eq}$ and $\hat{a}_{N-k,eq}$ to get two expressions for $a^*_{N-k}$ which can the be equated such that the solution for $a_k$ as a function of $\hat{a}_{k,eq}$ and $\hat{a}_{N-k,eq}$ can be obtained:

$$q_k = C_1 \hat{a}_{k,eq} + C_2 \hat{a}^*_{N-k,eq}$$

$$C_1 = \frac{1 + \rho_k \varepsilon_k}{1 - \varepsilon_k \varepsilon^*_{N-k}}$$

and $$C_2 = -\frac{\varepsilon_k(1 + \rho^*_{N-k}\varepsilon^*_{N-k})}{1 - \varepsilon_k \varepsilon^*_{N-k}}$$

In practice, $\varepsilon_k$ will not be known exactly, but rather estimated as $\hat{\varepsilon}_k$ resulting in some residual imbalance after compensation characterized by $\varepsilon_{k,\Delta}$. This residual offset can be compensated for by concatenating a second imbalance compensator to the first, where the first operates on $\hat{\varepsilon}_k$ and the second on $\varepsilon_{k,\Delta}$. By mathematically combining these two compensators such that the output of the first feeds into the input of the next, a single compensator using an equivalent set of coefficients can be determined. The result leads into the following recursive (or iterative) format $$C_1(i+1) = \frac{C_1(i)(1 + \rho_k\hat{\varepsilon}_k(i)) - C^*_2(i)\varepsilon_k(i)(1 + \rho^*_{N-k}\hat{\varepsilon}^*_{N-k}(i))}{1 - \hat{\varepsilon}_k(i)\hat{\varepsilon}^*_{N-k}(i)}$$

$$C_2(i+1) = \frac{C_2(i)(1 + \rho_k\hat{\varepsilon}_k(i)) - C^*_1(i)\varepsilon_k(i)(1 + \rho^*_{N-k}\hat{\varepsilon}^*_{N-k}(i))}{1 - \hat{\varepsilon}_k(i)\hat{\varepsilon}^*_{N-k}(i)}$$

where $C_1(0)=1, C_2(0)=0$, and $\hat{\varepsilon}_k(i)$ is the i-th estimate of the combined channel and residual imbalance measure for the k-th subcarrier.

Equalizer Averages Effects Of Imbalance

The results from immediately above can be reused here by setting $\rho_k=0$. Therefore, $$q_k = C_1 \hat{a}_{k,eq} + C_2 \hat{a}^*_{N-k,eq}$$

$$C_1(i+1) = \frac{C_1(i) - C^*_2(i)\varepsilon_k(i)}{1 - \hat{\varepsilon}_k(i)\hat{\varepsilon}^*_{N-k}(i)}$$

and $$C_2(i+1) = \frac{C_2(i) - C^*_1(i)\varepsilon_k(i)}{1 - \hat{\varepsilon}_k(i)\hat{\varepsilon}^*_{N-k}(i)}$$

where $C_1(0)=1, C_2(0)=0$ and $\hat{\varepsilon}_k(i)$ is the i-th estimate of the combined channel and residual imbalance measure for the k-th subcarrier.

Compensating For TX Imbalance At The Receiver—Fading Channel

In this section, an algorithm is developed for compensating for imbalance introduced by the far-end transmit mixer when a fading channel is present. It is assumed that either there is no receiver imbalance or it is perfectly compensated for.

Only frequency domain TX imbalance compensation is considered here. Again, this compensation can be performed assuming either an equalizer trained on a single or repeated OFDM symbol, or an equalizer that averages the effects of imbalance over many OFDM symbols.

Note that if frequency-domain compensation is used in conjunction with an adaptive equalizer (decision directed or not), the TX imbalance compensation must be done after equalizer compensation but before equalizer adaptation (i.e. the imbalance compensated values should be passed to the equalizer's update algorithm).

Equalizer Does Not Average Effects Of Imbalance

This case is identical to that of the combined TX/RX imbalance compensator where the equalizer does not average effects of imbalance, except here, the RX imbalance is assumed zero. Therefore, $$\varepsilon_k|_{TX\ only} = \frac{(\alpha - \beta)A_{\cos} + (\alpha_0 - \beta_0)A_{\sin}}{(\alpha + \beta)A_{\cos} + (\alpha_0 + \beta_0)A_{\sin}} = \frac{1 - \beta}{1 + \beta}$$

where $$\beta|_{TX\ only} = G^{tx}_m \exp(j\theta^{tx}_m)$$

which is not a function of frequency (as expected, because the channel equalizer removes the effects of the channel). Substituting this into the expressions for the compensator coefficients, $$q_k = C_1 \hat{a}_{k,eq} + C_2 \hat{a}^*_{N-k,eq}$$

$$C_1(i+1) = C_1(i)\frac{(1+\rho_k) + \hat{\beta}(i)(1-\rho_k)}{2(\hat{\beta}(i) + \hat{\beta}^*(i))}(1 + \hat{\beta}^*(i)) -$$

$$C^*_2(i)\frac{(1+\rho^*_{N-k}) + \hat{\beta}^*(i)(1-\rho^*_{N-k})}{2(\hat{\beta}(i) + \hat{\beta}^*(i))}(1 - \hat{\beta}(i))$$

$$C_2(i+1) = C_2(i)\frac{(1+\rho_k) + \hat{\beta}(i)(1-\rho_k)}{2(\hat{\beta}^*(i) + \hat{\beta}(i))}(1 + \hat{\beta}^*(i)) -$$

-continued $$C_1^*(i)\frac{(1+\rho_{N-k}^*)+\hat{\beta}^*(i)(1-\rho_{N-k}^*)}{2(\hat{\beta}^*(i)+\hat{\beta}(i))}(1-\hat{\beta}(i))$$

where $C_1(0)=1, C_2(0)=0$ and $\hat{\beta}(i)$ is the i-th estimate of the residual far-end TX imbalance.

Equalizer Averages Effects Of Imbalance

Recall that an equalizer that averages the frequency domain distortion due to imbalance is effectively averaging $\rho_k$ such that it tends towards zero. Thus the previous results from immediately above can be reused here by forcing $\rho_k=0$. Therefore, $q_k = C_1 \hat{a}_{k,eq} + C_2 \hat{a}^*_{N-k,eq}$ $$C_1(i+1) = C_1(i)\frac{1+\hat{\beta}(i)}{2(\hat{\beta}^*(i)+\hat{\beta}(i))}(1+\hat{\beta}^*(i)) - C_2^*(i)\frac{1+\hat{\beta}^*(i)}{2(\hat{\beta}^*(i)+\hat{\beta}(i))}(1-\hat{\beta}^*(i))$$

$$C_2(i+1) = C_2(i)\frac{1+\hat{\beta}(i)}{2(\hat{\beta}^*(i)+\hat{\beta}(i))}(1+\hat{\beta}^*(i)) - C_1^*(i)\frac{1+\hat{\beta}^*(i)}{2(\hat{\beta}^*(i)+\hat{\beta}(i))}(1-\hat{\beta}^*(i))$$

where $C_1(0)=1, C_2(0)=0$ and $\hat{\beta}(i)$ is the i-th estimate of the residual far-end TX imbalance.

Compensating For RX Imbalance At The Receiver—Fading Channel

In this section, an algorithm is developed for compensating for imbalance introduced by the receiver mixer when a fading channel is present. It is assumed that either there is no transmitter imbalance or it is compensated for at a later stage in the receiver; therefore, the equations derived for the effects of multipath fading can be used where $\alpha = 1 - jG^{rx}_m \sin\theta^{rx}_m,$ $\alpha_0 - jG^{rx}_m \cos\theta^{rx}_m,$ $\beta = j\alpha_0$ and $\beta_0 = -j\alpha$.

Both time-domain and frequency domain approaches to RX imbalance are considered. In the frequency domain, two cases are addressed: when the equalizer does not average the imbalance error and when the equalizer does average the imbalance error.

Time-Domain Compensation

Because the receiver I/Q imbalance occurs after the fading channel and the time-domain imbalance compensation occurs before channel equalization, the effects of the channel can be ignored. Thus, the results from above can be applied here where the TX imbalance effects are ignored. Note that because in the transceiver chain, the RX mixer is directly followed by the RX imbalance compensation (as opposed to having the TX mixer or TX imbalance compensator between the two), there is no issue about TX imbalance being present for RX imbalance compensation.

Therefore, with TX imbalance ignored, $\hat{x}_I(n) = C_{II}\hat{y}_I(n) + C_{IQ}\hat{y}_Q(n)$ and $\hat{x}_Q(n) = C_{QI}\hat{y}_I(n) + C_{QQ}\hat{y}_Q(n)$ where the compensator coefficients are $C_{II}=1, C_{IQ}=0$ $$C_{QI} = \frac{G^{rx}_m \sin\theta^{rx}_m}{G^{rx}_m \cos\theta^{rx}_m} = \tan\theta^{rx}_m, C_{QQ} = \frac{1}{G^{rx}_m \cos\theta^{rx}_m}$$

These coefficients can be rewritten in terms of $\alpha$ and $\alpha_0$ as follows:

$C_{II}=1, C_{IQ}=0$ $$C_{QI} = \frac{Im[\alpha]}{Im[\alpha_0]}, C_{QQ} = \frac{-1}{Im[\alpha_0]}$$

Note that the denominator can typically be ignored because the equalizer will account for it (this requires then that $C_{II}=Im[\alpha_0]$).

From the work above, with TX imbalance ignored, the iterative form is $C_{II}(i+1)=C_{II}(i)=1, C_{IQ}(i+1)=C_{IQ}(i)=0$ $$C_{QI}(i+1) = \frac{-C_{QI}(i) + Im[\hat{\alpha}(i)]}{Im[\hat{\alpha}_0(i)]},$$

$$C_{QQ}(i+1) = \frac{-C_{QQ}(i)}{Im[\hat{\alpha}_0(i)]}$$

where $C_{II}(0)=1, C_{IQ}(0)=0, C_{QI}(0)=0, C_{QQ}(0)=1$ and $\hat{\alpha}(i)$ and $\hat{\alpha}_0(i)$ are the i-th estimates of the residual imbalance. Again the denominator can be ignored provided that the frequency domain equalizer is adaptive or the error is deemed negligible (and that $C_{II}(i+1)=C_{II}(i)Im[\hat{\alpha}_0(i)])$

Frequency-Domain Compensation

The following sections derive the compensation algorithms for the two cases where the frequency domain equalizer either averages or does not average the imbalance error. Recall that even though the channel does not affect the RX imbalance, the equalizer will essentially pass the RX imbalance through the inverse of the channel making the effects of RX imbalance frequency dependent in the frequency domain.

Equalizer Does Not Average Effects Of Imbalance

This case is identical to that of the combined TX/RX imbalance compensator where the equalizer does not average effects of imbalance, except here, the TX imbalance is assumed zero. Therefore, $$\varepsilon_k |_{RX\ only} =$$

$$\frac{(\alpha-\beta)A_{\cos}+(\alpha_0-\beta_0)A_{\sin}}{(\alpha+\beta)A_{\cos}+(\alpha_0+\beta_0)A_{\sin}} = \frac{(A_{\cos}+jA_{\sin})(1-G_m^{rx}\exp(+j\theta_m^{rx}))}{(A_{\cos}-jA_{\sin})(1+G_m^{rx}\exp(-j\theta_m^{rx}))}$$

Because the $A_{cos}$ and $B_{sin}$ terms do not cancel, the imbalance effects cannot be separated from the channel effects and, in particular, because $A_{cos}$ and $B_{sin}$ vary with frequency, the effects of imbalance appear frequency dependent. Notice that $\epsilon_k$ is independent of the transmitted data and thus, will be constant over the duration of a packet.

Copying results from above, the imbalance compensator is $$q_k = C_1 \hat{a}_{k,eq} + C_2 \hat{a}^*_{N-k,eq}$$

$$C_1(i+1) = \frac{C_1(i)(1+\rho_k\hat{\varepsilon}_k(i)) - C_2^*(i)\varepsilon_k(i)(1+\rho_{N-k}^*\hat{\varepsilon}_{N-k}^*(i))}{1-\hat{\varepsilon}_k(i)\hat{\varepsilon}_{N-k}^*(i)}$$

$$C_2(i+1) = \frac{C_2(i)(1+\rho_k\hat{\varepsilon}_k(i)) - C_1^*(i)\varepsilon_k(i)(1+\rho_{N-k}^*\hat{\varepsilon}_{N-k}^*(i))}{1-\hat{\varepsilon}_k(i)\hat{\varepsilon}_{N-k}^*(i)}$$

where $$C_1(0)=1,\ C_2(0)=0$$

and $\hat{\rho}_k(i)$ is the i-th estimate of the combined channel and residual RX imbalance measure for the k-th subcarrier.

Equalizer Averages Effects Of Imbalance

The results from the section immediately above can be reused here by setting $\rho_k = 0$. Therefore, $$q_k = C_1 \hat{a}_{k,eq} + C_2 \hat{a}^*_{N-k,eq}$$

$$C_1(i+1) = \frac{C_1(i) - C_2^*(i)\varepsilon_k(i)}{1-\hat{\varepsilon}_k(i)\hat{\varepsilon}_{N-k}^*(i)}$$

and $$C_2(i+1) = \frac{C_2(i) - C_1^*(i)\varepsilon_k(i)}{1-\varepsilon_k(i)\varepsilon_{N-k}^*(i)}$$

where $$C_1(0)=1,\ C_2(0)=0$$

and $\hat{\epsilon}_k(i)$ is the i-th estimate of the combined channel and residual RX imbalance measure.

Compensating For TX and RX Imbalance At The Receiver—Flat Channel

The flat channel is a special case of the fading channel where the frequency response is essentially flat (i.e. the attenuation is constant over all subcarriers and the phase is linear). This case is of particular interest because during production, the channel is either a iore or a very short line of sight connection. In either case, the channel can be modeled as flat. The present invention can be extended to the flat channel case with a reasonable amount of further effort.

Imbalance Compensator Training

Several IQ imbalance compensation algorithms have been developed, without addressing how to obtain the parameters for those algorithms. The parameters identified included $G^{tx}_m$, $\theta^{tx}_m$, $\alpha$, $\beta$, $\alpha_0$, $\beta_0$ and $\epsilon_k$.

In all cases, except for TX imbalance compensation at the receiver, the imbalance can be estimated in the time-domain by either comparing a received training signal with its known value or by measuring and comparing the signal statistics between the in-phase and quadrature paths. Both these methods, but particularly the latter, require significant time averaging in order to remove the effects of noise. Typically, this is fine for measuring RX imbalance because it is constant or near constant over time; but it is more tedious for TX imbalance because it can change from packet to packet.

Estimating TX Imbalance

Recall that the received, equalized constellation point with no receive imbalance in a fading channel is $$\hat{a}_{k,eq}^{(TX)} = \frac{\alpha_k + \alpha_{N-k}^* \varepsilon_k^{(TX)}}{1 + \rho_k \varepsilon_k^{(TX)}} = \frac{\alpha_k(1+\beta) + \alpha_{N-k}^*(1-\beta)}{(1+\rho_k) + \beta(1-\rho_k)}$$

for $$\varepsilon_k^{(TX)} = \frac{1-\beta}{1+\beta}$$

Rearranging, $$\beta = -\frac{\alpha_k + \alpha_{N-k}^* - \hat{a}_{k,eq}^{(TX)}(1+\rho_k)}{\alpha_k - \alpha_{N-k}^* - \hat{a}_{k,eq}^{(TX)}(1-\rho_k)}$$

or $$1 - \beta = 2\frac{\alpha_k - \hat{a}_{k,eq}^{(TX)}}{\alpha_k - \alpha_{N-k}^* - \hat{a}_{k,eq}^{(TX)}(1-\rho_k)}$$

where $\beta$ represents $G^{tx}_m \exp(j\theta^{tx}_m)$. This yields a valid result except when $\{\rho_k=1,\ a_k=a^*_{N-k}\}$ and $\{\rho_k=-1,\ a_k=-a^*_{N-k}\}$ (in which case, the effects of imbalance cancel and the above expressions for $\beta$, in the absence of noise, will evaluate to 0 or ∞). If $a_k$ is unknown, then a decision feedback algorithm is required. $\beta$ can be averaged over k (sub-carriers and/or over time to reduce the effects of noise.

This $\beta$ estimate can be used directly in determining the coefficients for both the transmitter's frequency domain TX imbalance compensator and the receiver's frequency domain TX imbalance compensator. To determine the coefficients of the transmitter's time-domain TX imbalance compensator, $G^{tx}_m$ and $\theta^{tx}_m$ are computed as $$G^{tx}_m = |\hat{\beta}| = \sqrt{\left(Re[\hat{\beta}]\right)^2 + \left(Im[\hat{\beta}]\right)^2}$$

and $$\theta^{tx}_m = \sphericalangle\hat{\beta} = \tan^{-1}(Im[\hat{\beta}]/Re[\hat{\beta}])$$

This imbalance measurement is performed at the receiver and can be passed to the transmitter either over the link (for example, during deployment) or over a dedicated channel (typically during production or calibration).

In measuring $\beta$, it is assumed that there is no receiver imbalance. However, this is typically not the case and some receiver imbalance will be present. (For calibrated production equipment, the receiver imbalance is negligible or at least known.) Substituting $\hat{a}_{k,eq}$, which includes both TX and RX imbalance, into the estimate for $\beta$ which assumes only TX imbalance, the effect of RX imbalance on the TX imbalance measurement is determined $$\hat{\beta} = -\frac{\alpha_k + \alpha^*_{N-k} - \frac{\alpha_k + \varepsilon_k \alpha^*_{N-k}}{1+\varepsilon_k \rho_k}(1+\rho_k)}{\alpha_k - \alpha^*_{N-k} - \frac{\alpha_k + \varepsilon_k \alpha^*_{N-k}}{1+\varepsilon_k \rho_k}(1-\rho_k)} = \frac{1-\varepsilon_k}{1+\varepsilon_k} = \frac{\beta A_{\cos} + \beta_0 A_{\sin}}{\alpha A_{\cos} + \alpha_0 A_{\sin}}$$

$$= \frac{(G^{tx}_m G^{rx}_m \cos(\theta^{tx}_m - \theta^{rx}_m) + jG^{rx}_m \sin\theta^{rx}_m)A_{\cos} +}{(1-jG^{rx}_m \sin\theta^{rx}_m)A_{\cos} + (-jG^{rx}_m \cos\theta^{rx}_m)A_{\sin}}$$

$$= G^{tx}_m \cos\theta^{tx}_m \frac{G^{rx}_m \cos\theta^{rx}_m A_{\cos} - j(1-jG^{rx}_m \sin\theta^{rx}_m)A_{\sin}}{-jG^{rx}_m \cos\theta^{rx}_m A_{\sin} + (1-jG^{rx}_m \sin\theta^{rx}_m)A_{\cos}} + jG^{tx}_m \sin\theta^{tx}_m$$

From this, it can be seen that the RX imbalance terms do not cancel and thus will skew the estimate of the TX imbalance. Furthermore, because the RX imbalance effects are independent of the data pattern, averaging $\beta$ will not mitigate these effects. Of course, if RX imbalance compensation is performed in the time-domain, then as it converges, this TX imbalance measure will also converge.

Estimating RX Imbalance

Recall, the received equalized signal is (assuming no TX imbalance)

$$\hat{a}^{(RX)}_{k,eq} = \frac{\alpha_k + \alpha^*_{N-k} \varepsilon^{(RX)}_k}{1 + \rho_k \varepsilon^{(RX)}_k}$$

where $$\varepsilon^{(RX)}_k = \frac{(A_{\cos} + jA_{\sin})(1 - G^{rx}_m \exp(+j\theta^{rx}_m))}{(A_{\cos} - jA_{\sin})(1 + G^{rx}_m \exp(-j\theta^{rx}_m))}$$

Rearranging, $$\varepsilon^{(RX)}_k = \frac{\hat{a}^{(RX)}_{k,eq} - \alpha_k}{\alpha^*_{N-k} - \hat{a}^{(RX)}_{k,eq} \rho_k}$$

If $a_k$ is unknown, then a decision feedback algorithm is required. For each sub-carrier, $\epsilon^{(RX)}_k$ is constant and independent of the data and thus can be averaged over time to reduce the effects of noise. It can then be applied directly in the receiver's frequency domain RX imbalance compensator, as illustrated above. In fact, if TX imbalance is present, $\epsilon_k$ will be measured which incorporates both TX and RX imbalance and one of the compensators above can be used.

A major source of error not yet addressed is that of the equalizer due to AWGN noise. An equalizer cannot distinguish channel distortion from noise and thus must assume that the noise is negligible (equalizers typically train over long periods of time such that the noise can be averaged to negligible levels). Any equalizer error results in a gain and phase rotation on each sub-carrier. Unfortunately, this is the same average effect that imbalance has on the sub-carriers making it impossible to distinguish equalizer error from imbalance error, In order to compensate for this error, consider the error vector (ignoring all other impairments)

$$\vec{N}_k = \hat{a}^{(RX)}_{k,eq} - a_k = \frac{\varepsilon^{(RX)}_k(a^*_{N-k} - a_k \rho_k)}{1 + \rho_k \varepsilon^{(RX)}_k}$$

Notice that the imbalance error is zero whenever $\rho_k a^*_k = a_{N-k}$. Thus, the equalizer error can be estimated on those carriers which have no imbalance error $$\hat{\Omega}_{k,eq} = (\hat{a}^{(RX)}_{k,eq}/a_k)$$

given $\rho_k a^*_k = a_{N-k}$ and then used to estimate the imbalance using $$\varepsilon^{(RX)}_k = \frac{\hat{\Omega}^{-1}_{k,eq} \hat{a}^{(RX)}_{k,eq} - a_k}{a^*_{N-k} - \hat{\Omega}^{-1}_{k,eq} \hat{a}^{(RX)}_{k,eq} \rho_k}$$

given $\rho_k a^*_k \neq a_{N-k}$

The equalizer error is independent of the data transmitted and can be averaged over time for each of the sub-carriers.

Unfortunately, the measured $\epsilon^{(RX)}_k$ does not allow for the direct determination of $G^{rx}_m \exp(j\theta^{rx}_m)$ or $$\alpha = 1 - jG^{rx}_m \sin\theta^{rx}_m$$

and $$\alpha_0 = -jG^{rx}_m \cos\theta^{rx}_m.$$

These RX imbalance measures are required for the receiver's time-domain RX imbalance compensator. In this case, $\epsilon^{(RX)}{}_k$ can be used as a metric to train the adaptive time-domain RX imbalance compensator. The larger $\epsilon^{(RX)}{}_k$, the larger the imbalance. Unfortunately, because the channel effects cannot be separated from the imbalance effects, averaging over frequency will be imperfect (i.e. if the $\epsilon^{(RX)}{}_k$ are averaged as is, the various phase rotations will cause some cancellation; if the magnitudes of $\epsilon^{(RX)}{}_k$ are averaged, then noise will have a larger impact).

Alternatively, by multiplying $\epsilon$hu $(RX)_k$ by its conjugate, the following metric is obtained $$\varepsilon_k \varepsilon^*_{N-k} = \frac{(\alpha - \beta)(\alpha^* - \beta^*)}{(\alpha + \beta)(\alpha^* + \beta^*)}$$

$$\varepsilon_k \varepsilon^*_{N-k}|_{RX \text{ only}} = \frac{1 - 2G^{rx}_m \cos\theta^{rx}_m + G^{rx}_m G^{rx}_m}{1 + 2G^{rx}_m \cos\theta^{rx}_m + G^{rx}_m G^{rx}_m}$$

and $$\varepsilon_k \varepsilon^*_{N-k}|_{TX \text{ only}} = \frac{1 - 2G^{tx}_m \cos\theta^{tx}_m + G^{tx}_m G^{tx}_m}{1 + 2G^{tx}_m \cos\theta^{tx}_m + G^{tx}_m G^{tx}_m}$$

This removes the effect of the channel in the frequency domain. Unfortunately, it weights TX and RX imbalance equally and is sign invariant to the imbalance (i.e. $G^{tx}{}_m$ and $1/G^{tx}{}_m$ result in the same value and $\pm\theta^{tx}{}_m$ result in the same value). It is however, proportional to the imbalance and goes to zero when the imbalance goes to zero.

An alternative metric, which may be easier to compute is obtained by multiplying the error vector $\vec{N}_k$ by the conjugate of the $(a^*_{N-k} - a_k \rho_k)$ term, to remove the effect of the data's phase. This metric may be used to generate a table. The metric will have some constant angle with a magnitude that varies with the magnitude of the data.

$$\text{metric} = (\hat{a}^{(RX)}_{k,eq} - a_k)(a_{N-k} - a^*_k \rho^*_k)$$

Again, any equalizer error, $\Omega_{eq}$ can be removed by using those sub-carriers for which the imbalance error is zero (i.e. when $\rho_k a^*_k = a_{N-k}$).

$$\hat{\Omega}_{k,eq} = (\hat{a}^{(RX)}_{k,eq} / a_k)$$

given $\rho_k a^*_k = a_{N-k}$ $$\text{metric} = (\hat{a}^{(RX)}_{k,eq} \Omega^{-1}_{k,eq} a_k)(a_{N-k} - a^*_k \rho^*_k)$$

given $\rho_k a^*_k \neq a_{N-k}$

Note that the metric is still a function of the sub-carrier index, k and for each sub-carrier, the metric will have a unique phase. Thus, averaging these sub-carriers will be sub-optimal.

Application to IEEE 802.11a

IEEE 802.11a specifies an OFDM-based transceiver for wireless LAN applications. In order to meet the performance objectives of 802.11a, either the TX and TX imbalance must be designed to be very small or imbalance compensation must be applied.

In this section, the balance requirements are defined, imbalance compensation is proposed and simulation results are provided.

Balance Requirements

The appendix presents calculations of imbalance criteria that flow from the 802.11a standard.

Imbalance Compensation Proposal

Several imbalance compensation algorithms were presented above. Although all of these are applicable to 802.11a, a subset can be selected base primarily on system configuration and with the goal of minimizing implementation complexity.

Transmitter TX Imbalance Compensation

It is proposed that the transmitter precompensate for TX imbalance in the time-domain using the compensator derived for compensating for TX imbalance at the transmitter in the time-domain. This should be one of the last blocks after filtering and PA predistortion (if applicable) and before the D/A's. This allows the storage of the uncompensated short training symbols in the time-domain and eliminates any quantization or saturation issues, which might arise if the imbalance were compensated for in the frequency domain.

It is proposed that the transmitter's TX imbalance compensator be trained during production, prior to predistorter training and transmit level calibrations using the algorithm derived for estimating TX imbalance. In this case, the production receiver would make the measurement of $G^{tx}{}_m$ and $\theta^{tx}{}_m$ and relay these back to the transmitter under test. To minimize effort, the measurement would be performed on a BPSK packet using the typical 802.11a packet conventions. The production receiver would synchronize and train its frequency-domain equalizer on the long symbols and then measure the TX imbalance on subsequent OFDM symbols, averaging over frequency and time. It is necessary that the production receiver have little or no RX imbalance (either by component design, calibration or by RX imbalance compensation).

It is also possible to train the TX imbalance compensator during deployment (real-time). This would require some additional MAC functionality such that the $G^{tx}{}_m$ and $\theta^{tx}{}_m$ measurements could be relayed back to the transmitter. This would be particularly useful if it is found that TX imbalance wanders with time.

Although a feedback circuit could be used where the TX mixer output is feed back into the RX mixer and RX A/D's and then processed in the digital baseband, this is considered too complex.

Receiver TX Imbalance Compensation

It is proposed that the receiver compensate for TX imbalance in the frequency-domain using the compensator for an equalizer that does not average effects of imbalance. This compensator should follow the equalizer compensation but should precede the equalizer training (if adaptive). Compensation should be disabled during the L1 and L2 training symbols to enable the equalizer to attempt to compensate for the imbalance (recall, it was assumed that the equalizer did not average the imbalance over many symbols).

It is proposed that the TX imbalance be measured based on the signal field and averaged over all sub-carriers such that the effect of noise is reduced (i.e. averaging over 48 sub-carriers will reduce the noise by about 17 dB) using the algorithm for estimating TX imbalance. The signal field is unknown at the receiver and thus a hard decision is required. It is speculated that because the signal field is BPSK, in lower noise environments, the probability of a hard decoding error is negligible and thus the TX imbalance estimate will be accurate. In noisy environments, the probability of a hard decoding error will increase resulting in a less accurate TX imbalance estimate. This is acceptable in that in a noisy environment, it is not the distortion due to imbalance that dominates the noise. Regardless, the performance of the estimate can be improved by applying a weighted average where the weighting factor is the channel state information (CSI), computed as the reciprocal of the magnitude of the equalizer taps.

The TX imbalance measurement will typically be performed for each new packet. Of course, if it is known which transmitter will be transmitting next, TX imbalance compensation can be applied on the signal field and a residual TX imbalance measurement made. Based on this, the compensator coefficients can be updated and applied immediately thereafter.

Receiver RX Imbalance Compensation

It is proposed that for 802.11a, receiver RX imbalance compensation be performed in the time-domain as soon after the A/D's as possible using the time-domain compensator above. Performing RX compensation in the time-domain ensures that the RX imbalance effects are removed prior to the synchronization and equalization routines as well as before any TX imbalance measurements. Furthermore, the time-domain compensator is less complex to implement than its frequency-domain counterpart. RX imbalance compensation is applied 100% of the time.

It is proposed that the compensator be trained using an LMS type of feedback algorithm according to the discussion of receive imbalance compensation in the frequency domain.

If multiple receive radios are used, a separate set of coefficients can be stored for each radio. For selection diversity type of systems, only one radio is used at a time and the coefficients associated with that radio can be applied. If a more advanced diversity system is used, it may be necessary to combine the coefficients.

Performance Simulations

The imbalance compensation algorithms above are capable of compensating for all TX and RX imbalance. Given a perfect estimate, these algorithms should be able to perfectly compensate. In implementation, quantization and perhaps some approximations will be applied in which case the performance of the compensation will no longer be perfect; however, this is an implementation issue and is not addressed here. The performance aspect of imbalance compensation is in determining the coefficients for compensation. Even here, it is possible to get very near optimal performance depending on the system configuration. For example, for most systems, if not all, the RX imbalance will be constant from packet to packet enabling considerable averaging over time to remove noise and obtain very accurate compensator coefficients. If some form of point coordination function is used, then the same applies to the TX imbalance compensation at the receiver. A point coordination function coordinates which transmitter will be active at a particular time. A base station, for instance, may keep track of imbalance compensation coefficients for several remote transmitters and look up which coefficients to use, corresponding to the transmitter that will be active. Furthermore, TX imbalance estimates can be averaged over multiple packets for one or more remote transmitters, using point coordination. Nonetheless, in this section, tolerable levels of imbalance for various typical OFDM sub-carrier constellations are determined and also the performance of some of the coefficient training algorithms is measured.

Imbalance Measures

In a preceding section regarding estimating RX imbalance, two metrics of imbalance were discussed. For the alternative metric, which may be easier to compute, the following data was compiled by simulation. In this table, rows are organized by the signal-to-noise ratio measured at the receiver. The columns indicate extents of imbalance, in dB gain imbalance and degrees phase imbalance. In the following table, results of a simulation are tabulated. The simulation was run for 400 OFDM symbols, Quadrature Phase Shift Keying (QPSK) and random fading channels. Errors were measured and averaged over 10 simulation runs. The table reports the minimum→maximum range, the mean and a measure of variance from the simulation runs.

|           | 1 dB, 5 degrees | 0.5 dB, 2.5 degrees | 0.25 dB 1.25 degrees | No imbalance |
|-----------|-----------------|---------------------|----------------------|--------------|
| 10 dB SNR | 0.1583->0.2080  | 0.1061->0.1399      | 0.0659->0.1048       | 0.0712->0.0930 |
|           | m = 0.18827     | m = 0.12156         | m = 0.08951          | m = 0.08250  |
|           | s = 0.01557391  | s = 0.01103965      | s = 0.01057917       | s = 0.00873155 |
| 20 dB SNR | 0.1927->0.2076  | 0.1001->0.1113      | 0.0522->0.0628       | 0.0206->0.0327 |
|           | m = 0.20015     | m = 0.10421         | m = 0.05506          | m = 0.02573  |
|           | s = 0.00517778  | s = 0.00357754      | s = 0.00359017       | s = 0.00389445 |
| 30 dB SNR | 0.1956->0.2035  | 0.0980->0.1032      | 0.0494->0.0529       | 0.0056->0.0088 |
|           | m = 0.19932     | m = 0.10073         | m = 0.05092          | m = 0.00777  |
|           | s = 0.00232178  | s = 0.00147652      | s = 0.00112428       | s = 0.00086801 |

Rows in the table are organized by SNR at the receiver: receive signal divided by the noise level at the receiver. Columns are organized by various gain and phase imbalance combinations. From this table, we see that the metric grows as the imbalance gets worse. We can estimate this metric, even when it is extremely noisy. This metric converges and has a small variance.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to implement the methods, media impressed with logic to carry out the methods, data streams impressed with logic to carry out the methods, or computer-accessible processing services. It is contemplated that modifications and combinations will readily occur to those skilled in the art, which modifications and combinations will be within the spirit of the invention and the scope of the following claims.

APPENDIX: IMBALANCE REQUIREMENTS FOR 802.11A

It is desirable to limit the effects of phase ($\pm\delta\phi$) and amplitude ($\pm\epsilon$) mismatches in I and Q to 5 dB or less below the quantization floor of the A/D converter used in a system. This assists in rejection of errors that otherwise might be introduced by phase and amplitude imbalance. The derivations from the case of no channel and a perfectly trained adaptive equalizer can be used to consider the issue. For example, assuming imbalance at the transmit side only and given $\epsilon=1.41$ and $0^{tx}_m=0$, the signal-to distortion ratio can be computed as $G^{tx}_m = 20\log_{10}(1 + 2\epsilon/100) = 0.2416$ dB $$\gamma_{Imb}|_{TX \text{ only}} = \frac{1 + 2G^{tx}_m \cos\theta^{tx}_m + (G^{tx}_m)^2}{1 - 2G^{tx}_m \cos\theta^{tx}_m + (G^{tx}_m)^2} = 37.14 \text{ dB}$$

Similarly for the phase, given $G^{tx}_m=0$ and $\delta\phi=0.82$ degrees $\theta^{tx}_m = 2\delta\phi = 1.64$ degrees $$\gamma_{Imb}|_{TX \text{ only}} = \frac{1 + 2G^{tx}_m \cos\theta^{tx}_m + (G^{tx}_m)^2}{1 - 2G^{tx}_m \cos\theta^{tx}_m + (G^{tx}_m)^2} = 36.89 \text{ dB}.$$

When the gain and phase imbalance are considered together, the signal to-distortion ratio drops to 34 dB or about 3 dB worse. When both the transmitter and receiver have this imbalance (i.e. worst-case, aligned), the signal-to-distortion ratio drops to 28 dB. For 802.11a, the equalizer is typically trained on a single OFDM symbol repeated twice and thus the equalizer will not train perfectly and an additional 3 dB penalty is expected. These calculations provide guidance as to the impact of imbalance.

I claim:

1. A method of compensating for transmitter imbalance in a multi-carrier, ODFM symbol transmission system, including:
   estimating transmitter gain and phase imbalance by measuring signals on a plurality of carriers of the multi-carrier system, wherein estimating includes
      deducing constellation points transmitted from a received signal; and
      calculating one or more differences between the received signal and an intended signal corresponding to the deduced constellation points; and
   determining compensation parameters from the imbalance;
   loading the compensation parameters into the transmitter, whereby the compensation parameters can be used to compensate for transmitter gain and phase imbalance.

2. The method of claim 1, wherein the estimating step is a frequency domain estimation.

3. The method of claim 1, wherein the estimating step is a frequency domain estimation performed after processing a received signal through an equalizer.

4. The method of claim 3, wherein a plurality but fewer than all of the carriers of the multicarrier system are utilized in the estimating step.

5. The method of claim 1, wherein the estimating step is a frequency domain estimation such that:

$$\hat{a}_k = \begin{cases} \frac{1}{2}\sum_{p=0}^{N_p-1} G_p \exp(-j2\pi f_s t_p k/N) \begin{Bmatrix} \cos(\theta)[(\alpha+\beta)a_k + (\alpha-\beta)a^*_{N-k}] + \\ \sin(\theta)[(\alpha_0+\beta_0)a_k + (\alpha_0-\beta_0)a^*_{N-k}] \end{Bmatrix} & 0 \le k < N/2 \\ \frac{1}{2}\sum_{p=0}^{N_p-1} G_p \exp(-j2\pi f_s t_p(k-N)/N) \begin{Bmatrix} \cos(\theta)[(\alpha+\beta)a_k + (\alpha-\beta)a^*_{N-k}] + \\ \sin(\theta)[(\alpha_0+\beta_0)a_k + (\alpha_0-\beta_0)a^*_{N-k}] \end{Bmatrix} & N/2 \le k < N \end{cases}, \text{ where}$$

$\hat{a}_k$ is a received value of a constellation point, k being the carrier index among the plurality of carriers;

$a_k$ is a transmitted value of the constellation point for a kth carrier;

$a^*_{N-k}$ is a complex conjugate of the transmitted value of the constellation point for an N–k th carrier, where N is a total number of carriers;

$f_s$ is a sampling rate of an analog to digital converter in a receiver used to process the received value;

$t_p$ is a delay measure for the pth carrier, p being an additional carrier index among the plurality of carriers;

$\alpha$, $\alpha_0$, $\beta$ and $\beta_0$ are intermediary values treated as time-invariant:

$\alpha = 1 - jG^{rx}_m \sin(\theta^{rx}_m)$ $\beta = G^{tx}_m G^{rx}_m \cos(\theta^{tx}_m - \theta^{rx}_m) + jG^{tx}_m \sin(\theta^{tx}_m)$ $\alpha_0 = -jG^{rx}_m \cos(\theta^{rx}_m)$ $\beta_0 = G^{tx}_m G^{rx}_m \sin(\theta^{tx}_m - \theta^{rx}_m) - jG^{tx}_m \cos(\theta^{tx}_m)$ $G^{rx}_m$ is gain imbalance of a receiver's mixer;

$G^{tx}_m$ is gain imbalance of the transmitter's mixer;

$\theta^{rx}_m$ is phase imbalance of the receiver's mixer; and $\theta^{tx}_m$ is gain imbalance of the transmitter's mixer.

6. The method of claim 1, wherein the estimating step is a frequency domain estimation performed after processing a received signal through an equalizer, such that:

$$G^{tx}_m = |\hat{\beta}| = \sqrt{(Re[\hat{\beta}])^2 + (Im[\hat{\beta}])^2}$$

and $$\theta^{tx}_m = \sphericalangle\hat{\beta} = \tan^{-1}(Im[\hat{\beta}]/Re[\hat{\beta}]),$$

where $$\hat{\beta} = -\frac{a_k + a^*_{N-k} - \hat{a}^{(TX)}_{k,eq}(1+\rho_k)}{a_k - a^*_{N-k} - \hat{a}^{(TX)}_{k,eq}(1-\rho_k)}$$

and $G^{tx}_m$ is gain imbalance of the transmitter's mixer;
$\theta^{tx}_m$ is gain imbalance of the transmitter's mixer;
$\hat{\beta}$ is an estimated value;
$\hat{a}^{(TX)}_{k,eq}$ is a received value of a constellation point, including TX transmitter imbalance, after the processing the received signal through the equalizer, k being the carrier index among the multiple carrier channels;
$a_k$ is a transmitted value of the constellation point for a k th carrier;
$a^*_{N-k}$ is the complex conjugate of the transmitted value of the constellation point for an N–k th carrier, where N is a total number of carriers;
$\rho_k$ is a ratio $$\rho_k = a^*_{N-k}/a_k$$

of transmitted symbols used for equalizer training.

7. The method of claim 1 further including communicating from a receiver to the transmitter the receiver's estimates of the transmitter imbalance.

8. The method of claim 1, wherein the estimating step includes measuring the imbalances prior to delivery of the system to a customer, by analyzing a received signal corresponding to one or more predetermined training packets transmitted according to standard packet conventions.

9. The method of claim 8, wherein the predetermined training packets include a second symbol that is a sign inverted equivalent of a first symbol.

10. The method of claim 1, wherein the estimating step further includes:
transmitting one or more predetermined training packets according to standard packet conventions through a substantially noise-free communication channel; and
performing a time-domain analysis of received packets without processing the received packets through an equalizer.

11. The method of claim 10, wherein the predetermined training packets include a second symbol that is a sign inverted equivalent of a first symbol.

12. The method of claim 1, wherein the transmitter is adapted to perform time domain compensation for the imbalances, such that:

$$y_I(n) = x_I(n) + x_Q(n)\tan(\theta^{tx}_m)$$

and $y_Q(n) = x_Q(n)[G^{tx}_m\cos(\theta^{tx}_m)]^{-1}$ where $x_I(n)$ is an in-phase component of a signal being compensated;
$x_Q(n)$ is a quadrature component of the signal being compensated;
$y_I(n)$ is an in-phase component of the signal after being compensated;
$y_Q(n)$ is a quadrature component of the signal after being compensated;
$G^{tx}_m$ is an estimate of the gain imbalance; and
$\theta^{tx}_m$ is an estimate of the phase imbalance.

13. The method of claim 12, wherein the compensation parameters are determined iteratively, from a starting estimate, such that:

$$G^{tx}_m(i+1) = G^{tx}_m(i)\hat{G}^{tx}_m$$

and $$\theta^{tx}_m(i+1) = \theta^{tx}_m(i) + \hat{\theta}^{tx}_m,$$

where $\hat{G}^{tx}_m(i)$ and $\hat{\theta}^{tx}_m(i)$ are i-th estimates of residual gain and phase imbalance.

14. The method of claim 1, wherein the transmitter is adapted to perform frequency domain compensation for the imbalances, such that:

$$\hat{a}_k|_{TX\ only} = \frac{1+\beta_\Delta}{2}a_k + \frac{1-\beta_\Delta}{2}a^*_{N-k}$$

where $\hat{a}_k|_{TX\ only}$ is a received value of a constellation point, including TX transmitter imbalance, after the processing the received signal through the equalizer, k being the carrier index among the multiple carrier channels;
$a_k$ is a transmitted value of the constellation point for a k th carrier;
$a^*_{N-k}$ is the complex conjugate of the transmitted value of the constellation point for an N–k th carrier, where N is a total number of carriers; and
$\beta_\Delta$ is a residual offset that is compensated for by either concatenating a second compensator to the original or by updating the original coefficients to include the residual offset.

15. The method of claim 14, wherein the compensation parameters are determined iteratively, from a starting estimate, such that:

$$C_1(i+1) = C_1(i)\frac{1+\hat{\beta}^*(i)}{\hat{\beta}(i)+\hat{\beta}^*(i)} - C^*_2(i)\frac{1-\hat{\beta}(i)}{\hat{\beta}(i)+\hat{\beta}^*(i)}$$

$$C_2(i+1) = C_2(i)\frac{1+\hat{\beta}^*(i)}{\hat{\beta}(i)+\hat{\beta}^*(i)} - C^*_1(i)\frac{1-\hat{\beta}(i)}{\hat{\beta}(i)+\hat{\beta}^*(i)}$$

where $$C_1(0)=1,\ C_2(0)=0$$

and $\hat{\beta}(i)$ is an i-th estimate of residual TX imbalance.

16. A method of compensating for transmitter imbalances in a multi-carrier, OFDM symbol transmission system, including:

estimating transmitter gain and phase imbalance by measuring signals on a plurality of carriers of the multi-carrier system, wherein estimating includes analyzing a received signal corresponding to one or more predetermined training packets transmitted according to standard packet conventions; and compensating in the transmitter for the transmitter imbalance responsive to the estimated transmitted gain and phase imbalance.

17. A method of compensating for receiver imbalance in a multi-carrier, OFDM symbol transmission system, including:

estimating receiver gain and phase imbalance by measuring signals on a plurality of carriers of the multi-carrier system, utilizing a transmitter having known imbalance characteristics, wherein estimating includes measuring the imbalances prior to delivery of the system to a customer, by analyzing a received signal corresponding to one or more predetermined training packets transmitted according to standard packet conventions;

determining compensation parameters from the receiver imbalances; and loading the compensating parameters in the receiver to be used to compensate for receiver gain and phase imbalance.

18. The method of claim 17, wherein the estimating step is a frequency domain estimation.

19. The method of claim 17, wherein the estimating step is a frequency domain estimation performed after processing a received signal through an equalizer.

20. The method of claim 19, wherein a plurality but fewer than all of the multiple carrier channels are utilized in the estimating step.

21. The method of claim 17, wherein the estimating step is a frequency domain estimation, such that:

$$\hat{a}_k = \begin{cases} \frac{1}{2}\sum_{p=0}^{N_p-1} G_p \exp(-j2\pi f_s t_p k/N) \begin{Bmatrix} \cos(\theta)[(\alpha+\beta)a_k + (\alpha-\beta)a_{N-k}^*] + \\ \sin(\theta)[(\alpha_0+\beta_0)a_k + (\alpha_0-\beta_0)a_{N-k}^*] \end{Bmatrix} & 0 \leq k < N/2 \\ \frac{1}{2}\sum_{p=0}^{N_p-1} G_p \exp(-j2\pi f_s t_p (k-N)/N) \begin{Bmatrix} \cos(\theta)[(\alpha+\beta)a_k + (\alpha-\beta)a_{N-k}^*] + \\ \sin(\theta)[(\alpha_0+\beta_0)a_k + (\alpha_0-\beta_0)a_{N-k}^*] \end{Bmatrix} & N/2 \leq k < N \end{cases}, \text{ where}$$

$\hat{a}_k$ is a received value of a constellation point, k being the carrier index among the plurality of carriers;

$a_k$ is a transmitted value of the constellation point for a kth carrier;

$a^*_{N-k}$ is a complex conjugate of the transmitted value of the constellation point for an N−k th carrier, where N is a total number of carriers;

$f_t$ is a sampling rate of an analog to digital converter in a receiver used to process the received value;

$t_p$ is a delay measure for the pth carrier, p being an additional carrier index among the plurality of carriers;

$\alpha, \alpha_0, \beta$ and $\beta_0$ are intermediary values treated as time-invariant:

$\alpha = 1 - jG^{rx}_m \sin(\theta^{rx}_m)$ $\beta = G^{rx}_m G^{tx}_m \cos(\theta^{tx}_m - \theta^{rx}_m) + jG^{tx}_m \sin(\theta^{tx}_m)$ $\alpha_0 = -jG^{rx}_m \cos(\theta^{rx}_m)$ $\beta_0 = G^{rx}_m G^{tx}_m \sin(\theta^{tx}_m - \theta^{rx}_m) - jG^{tx}_m \cos(\theta^{tx}_m)$ $G^{rx}_m$ is gain imbalance of a receiver's mixer;
$G^{tx}_m$ is gain imbalance of the transmitter's mixer;
$\theta^{rx}_m$ is phase imbalance of the receiver's mixer; and
$\theta^{tx}_m$ is gain imbalance of the transmitter's mixer.

22. The method of claim 17, wherein the estimating step is a frequency domain estimation performed after processing a received signal through an equalizer, such that:

a metric $\epsilon_k \epsilon^*_{N-k}|_{RX\ only}$ is substantially minimized, $$\epsilon_k \epsilon^*_{N-k}|_{RX\ only} = \frac{1 - 2G^{rx}_m \cos\theta^{rx}_m + G^{rx}_m G^{rx}_m}{1 + 2G^{rx}_m \cos\theta^{rx}_m + G^{rx}_m G^{rx}_m}$$

and $$\epsilon_k^{(RX)} = \frac{\hat{a}_{k,eq}^{(RX)} - a_k}{a_{N-k}^* - \hat{a}_{k,eq}^{(RX)} \rho_k},$$

where
$\hat{a}_k$ is a received value of a constellation point, k being the carrier index among the plurality of carriers;

$a_k$ is a transmitted value of the constellation point for a kth carrier;

$a^*_{N-k}$ is a complex conjugate of the transmitted value of the constellation point for an N−k th carrier, where N is a total number of carriers;

$G^{rx}_m$ is gain imbalance of a receiver's mixer;
$\theta^{rx}_m$ is phase imbalance of the receiver's mixer; and
$\rho_k$ is a ratio $\rho_k = a^*_{N-k}/a_k$ of transmitted symbols used for equalizer training.

23. The method of claim 17, wherein the estimating step further includes:

deducing constellation points transmitted from a received signal; and calculating one or more differences between the received signal and an intended signal corresponding to the deduced constellation points.

24. The method of claim 17, wherein at the predetermined training packets includes a second symbol that is a sign inverted equivalent of a first symbol.

25. The method of claim 17, wherein the estimating step further includes:

transmitting one or more predetermined packets according to standard packet conventions through a substantially noise-free communications channel; and performing a time domain analysis of received packets without processing the received packets through an equalizer.

26. The method of claim 25, wherein at the predetermined training packets includes a second symbol that is a sign inverted equivalent of a first symbol.

27. The method of claim 17, wherein the receiver is adapted to compensate for the imbalances, such that $\hat{x}_I(n) = C_{II}\hat{y}_I(n) + C_{IQ}\hat{y}_Q(n)$ and $\hat{x}_Q(n) = C_{QI}\hat{y}_I(n) + C_{QQ}\hat{y}_Q(n)$ where the compensator coefficients are
$C_{II}=1$, $C_{IQ}=0$ $C_{QI} = \frac{G_m^{rx}\sin\theta_m^{rx}}{G_m^{rx}\cos\theta_m^{rx}} = \tan\theta_m^{rx}$, $C_{QQ} = \frac{1}{G_m^{rx}\cos\theta_m^{rx}}$, where
- $x_I(n)$ is an in-phase component of a signal being compensated;
- $x_Q(n)$ is a quadrature component of the signal being compensated;
- $y_I(n)$ is an in-phase component of the signal after being compensated;
- $y_Q(n)$ is a quadrature component of the signal after being compensated;
- $\hat{a}_k$ is a received value of a constellation point, k being the carrier index among the plurality of carriers;
- $a_k$ is a transmitted value of the constellation point for a kth carrier;
- $a^*_{N-k}$ is a complex conjugate of the transmitted value of the constellation point for an N−k th carrier, where N is a total number of carriers;
- $G^{rx}_m$ is an estimate of gain imbalance; and
- $\theta^{rx}_m$ is an estimate of phase imbalance.

28. The method of claim 27, wherein the compensation parameters are determined iteratively, from a starting estimate, such that:

$C_{II}(i+1) = C_{II}(i) = 1$, $C_{IQ}(i+1) = C_{IQ}(i) = 0$ $C_{QI}(i+1) = \frac{-C_{QI}(i) + \text{Im}[\hat{\alpha}(i)]}{\text{Im}[\hat{\alpha}_{ij}(i)]}$, $C_{QQ}(i+1) = \frac{-C_{QQ}(i)}{\text{Im}[\hat{\alpha}_0(i)]}$ where $C_{II}(0)=1$, $C_{IQ}(0)=0$, $C_{QI}(0)=0$, $C_{QQ}(0)=1$ and $\hat{\alpha}(f)$ and $\hat{\alpha}_0(f)$ are the i-th estimates of the residual imbalance.

29. The method of claim 27, wherein the compensation parameters are determined iteratively, from a starting estimate, such that $G^{rx}_m(i+1) = G^{rx}_m(i)\hat{G}^{rx}_m$ and $\theta^{rx}_m(i+1) = \theta^{rx}_m(f) + \hat{\theta}^{rx}_m$, where $\hat{G}^{rx}_m(f)$ and $\hat{\theta}^{rx}_m(f)$ are i-th estimates of residual gain and phase imbalance.

30. A method of compensating for transmitter and receiver imbalance in a multi-carrier, OFDM symbol transmission system, including:
- estimating combined transmitter and receiver gain and phase imbalance across multiple carrier channels wherein estimating includes deducing constellation points transmitted from a received signal, and calculating one or more differences between the received signal and an intended signal corresponding to the deduced constellation points; and
- determining compensation parameters from the combined imbalance; and
- loading the compensation parameters in the receiver to be used to compensate for the combined imbalance.

31. The method of claim 30, wherein the estimating step is a frequency domain estimation, such that:

$\tilde{a}_k = C_1\hat{a}_{k,eq} + C_2\hat{a}^*_{N-k,eq}$, $C_1 = \frac{1 + \rho_k\varepsilon_k}{1 - \varepsilon_k\varepsilon^*_{N-k}}$ and $C_2 = -\frac{\varepsilon_k(1 + \rho^*_{N-k}\varepsilon^*_{N-k})}{1 - \varepsilon_k\varepsilon^*_{N-k}}$ where $\varepsilon_k^{(RX)} = \frac{\hat{a}^{(RX)}_{k,eq} - a_k}{a^*_{N-k} - \hat{a}^{(RX)}_{k,eq}\rho_k}$.

- $\hat{a}^{(RX)}_{k,eq}$ $\hat{a}_k$ is a received value of a constellation point after processing through an equalizer, k being the carrier index among the plurality of carriers;
- $a_k$ is a transmitted value of the constellation point for a kth carrier;
- $a^*_{N-k}$ is a complex conjugate of the transmitted value of the constellation point for an N−k th carrier, where N is a total number of carriers; and
- $\rho_k$ is a ratio $\rho_k = a^*_{N-k}/a_k$ of transmitted symbols used for equalizer training.

32. The method of claim 30, wherein the compensation parameters are determined iteratively, from a starting estimate, such that:

$C_1(i+1) = \frac{C_1(i)(1 + \rho_k\hat{\varepsilon}_k(i)) - C^*_2(i)\varepsilon_k(i)(1 + \rho^*_{N-k}\hat{\varepsilon}^*_{N-k}(i))}{1 - \hat{\varepsilon}_k(i)\hat{\varepsilon}^*_{N-k}(i)}$ $C_2(i+1) = \frac{C_2(i)(1 + \rho_k\hat{\varepsilon}_k(i)) - C^*_1(i)\varepsilon_k(i)(1 + \rho^*_{N-k}\hat{\varepsilon}^*_{N-k}(i))}{1 - \hat{\varepsilon}_k(i)\hat{\varepsilon}^*_{N-k}(i)}$ where $C_1(0)=1$, $C_2(0)=0$ and $\hat{\epsilon}_k(f)$ is the i-th estimate of a combined imbalance for the k-th subcarrier.

33. The method of claim 30, wherein a receiver component of the combined imbalance has a predetermined value, the compensation parameters for the receiver component of the combined imbalance are time domain parameters and the compensation parameters for transmitter component of the combined imbalance are frequency domain parameters.

34. The method of claim 33, wherein the estimating step is a frequency domain estimation, such that:

$q_k = C_1\hat{a}_{k,eq} + C_2\hat{a}^*_{N-k,eq}$, where $C_1(i+1) = C_1(i)\frac{(1 + \rho_k) + \hat{\beta}(i)(1 - \rho_k)}{2(\hat{\beta}(i) + \hat{\beta}^*(i))}(1 + \hat{\beta}^*(i)) -$ -continued $$C_2^*(i) \frac{(1+\rho_{N-k}^*) + \hat{\beta}(i)(1-\rho_{N-k}^*)}{2(\hat{\beta}(i) + \hat{\beta}^*(i))}(1-\hat{\beta}(i))$$

$$C_2(i+1) = C_2(i) \frac{(1+\rho_k) + \hat{\beta}(i)(1-\rho_k)}{2(\hat{\beta}^*(i) + \hat{\beta}(i))}(1+\hat{\beta}^*(i)) -$$

$$C_1^*(i) \frac{(1+\rho_{N-k}^*) + \hat{\beta}^*(i)(1-\rho_{N-k}^*)}{2(\beta^*(i) + \hat{\beta}(i))}(1-\hat{\beta}(i))$$

where $C_1(0)=1$, $C_2(0)=0$ and $\beta(f)$ is the f-th estimate of a residual far-end TX imbalance.

35. The method of claim 34, wherein i takes a single value, i=0, subject to $C_1(0)=1, C_2(0)=0$.

36. The method of claim 33, wherein the estimating step is a frequency domain estimation, such that $$q_k = C_1 \hat{a}_{k,eq} + C_2 \hat{a}^*_{N-k,eq}, \text{ where}$$

$$C_1(i+1) = C_1(i) \frac{1+\hat{\beta}(i)}{2(\hat{\beta}^*(i) + \hat{\beta}(i))}(1+\hat{\beta}^*(i)) - C_2^*(i) \frac{1+\hat{\beta}^*(i)}{2(\beta^*(i) + \hat{\beta}(i))}(1-\hat{\beta}^*(i))$$

$$C_2(i+1) = C_2(i) \frac{1+\hat{\beta}(i)}{2(\hat{\beta}^*(i) + \hat{\beta}(i))}(1+\hat{\beta}^*(i)) - C_1^*(i) \frac{1+\hat{\beta}^*(i)}{2(\beta^*(i) + \hat{\beta}(i))}(1-\hat{\beta}(i))$$

where $C_1(0)=1$, $C_2(0)=0$ and $\hat{\beta}(i)$ is the i-th estimate of a residual far-end TX imbalance.

37. The method of claim 36, wherein i takes a single value, i=0 subject to $C_1(0)=1$, $C_2(0)=0$.

38. The method of claim 30, wherein the estimating step is a frequency domain estimation performed after processing a received signal through an equalizer, such that:

a metric $\epsilon_k \epsilon^*_{N-k}|_{TX\ only}$ is substantially minimized.

$$\varepsilon_k \varepsilon^*_{N-k}|_{TZ\ only} = \frac{1 - 2G_m^{tx}\cos\theta_m^{tx} + G_m^{tx}G_m^{tx}}{1 + 2G_m^{tx}\cos\theta_m^{tx} + G_m^{tx}G_m^{tx}}$$

and $$\varepsilon_k = \frac{\hat{a}_{k,eq} - a_k}{a^*_{N-k} - \hat{a}_{k,eq}\rho_k},$$

where
- $\hat{a}_k$ is a received value of a constellation point, k being the carrier index among the plurality of carriers;
- $a_k$ is a transmitted value of the constellation point for a kth carrier;
- $a^*_{N-k}$ is a complex conjugate of the transmitted value of the constellation point for an N−k th carrier, where N is a total number of carriers;
- $G^{rx}_m$ is gain imbalance of a receiver's mixer;
- $\theta^{rx}_m$ is phase imbalance of the receiver's mixer; and
- $\rho_k$ is a ratio $\rho_k = a^*_{N-k}/a_k$ of transmitted symbols used for equalizer training.

39. A system of compensating for transmitter imbalance in a multi-carrier, OFDM symbol transmission system, including:
- a receiver including logic to estimate transmitter gain and phase imbalance in a frequency domain across multiple carrier channels and to determine compensation parameters from imbalances,
- wherein estimating transmitter gain and phase imbalance in a frequency domain across multiple carrier channels and determining compensation parameters from imbalances includes
  - deducing constellation points transmitted from a received signal; and
  - calculating one or more differences between the received signal and an intended signal corresponding to the deduced constellation points; and
- a transmitter having memory to store the compensation parameters, whereby the compensation parameters can be used to compensate for transmitter gain and phase imbalance; and
- a transmitter parameter loader, coupled to the logic to estimate and to the memory to store the compensation parameter.

40. A system of compensating for transmitter imbalance is a multi-carrier, OFDM symbol transmission system, including:
- a transmitter having a frequency domain analyzer section including logic to estimate transmitter gain and phase imbalance across multiple carrier channels from a transmission signal and to determine compensation parameters from the imbalances, wherein estimating transmitter gain and phase imbalance in a frequency domain across multiple carrier channels and determining compensation parameters from imbalances includes
  - deducing constellation points transmitted from a received signal; and
- calculating one or more differences between the received signal and an intended signal corresponding to the deduced constellation points; and
- memory to store the compensation parameters, coupled to the transmitter, whereby the compensation parameters can be used to compensate for transmitter gain and phase imbalance; and
- logic to load the compensation parameters into memory.

41. A system of compensating for receiver imbalance in a multi-carrier, OFDM symbol transmission system, including:
- a receiver including logic to estimate receiver gain and phase imbalance in a frequency domain across multiple carrier channels and to determine compensation parameters from the imbalances,
- wherein estimating receiver gain and phase imbalance in a frequency domain across multiple carrier channels and determining compensation parameters from the imbalances includes
  - deducing constellation points transmitted from a received signal, and
  - calculating one or more differences between the received signal and an intended signal corresponding to the deduced constellation points; and memory to store the compensation parameters coupled to the receiver, whereby the compensation parameters can be used to compensate for the imbalances;

a receiver parameter loader, coupled to the logic to estimate and to memory to store the compensation parameters.

42. A system for compensating for transmitter and receiver imbalance in a multi-carrier, OFDM system, including:

a receiver including logic to estimate combined receiver and transmitter gain and phase imbalance in a frequency domain across multiple carrier channels and to determine compensation parameters from the imbalances, wherein estimating combined receiver and transmitter gain and phase imbalance in a frequency domain across multiple carrier channels and determining compensation parameters from the imbalances includes deducing constellation points transmitted from a received signal, and calculating one or more differences between the received signal and an intended signal corresponding to the deduced constellation points; and memory to store the compensation parameters, coupled to the receiver, whereby the compensation parameters can be used to compensate for the imbalances; and a receiver parameter loader, coupled to the logic to estimate and to the memory to store the compensation parameters.

* * * * *